US005762897A

United States Patent [19]
Chang et al.

[11] Patent Number: 5,762,897
[45] Date of Patent: Jun. 9, 1998

[54] METHOD FOR MANUFACTURING HYDROXYLAMINE

[75] Inventors: Chin-Hsiung Chang, Palatine, Ill.;
Albert S. Stella, Florham Park, N.J.;
Miguel A. Gualdron, Skokie, Ill.;
Wende M. Fisher, Bloomingdale, Ill.;
Mike Poole, Villa Park, Ill.

[73] Assignee: AlliedSignal Inc., Morristown, N.J.

[21] Appl. No.: 642,721

[22] Filed: May 3, 1996

[51] Int. Cl.$^6$ .................................................. C01B 21/20
[52] U.S. Cl. ........................ 423/387; 210/662; 210/670; 210/674; 210/683; 210/685
[58] Field of Search ................ 423/387; 210/662, 210/670, 674, 683, 685

[56] References Cited

U.S. PATENT DOCUMENTS

| | | | |
|---|---|---|---|
| 2,985,589 | 5/1961 | Broughton et al. | 210/34 |
| 3,040,777 | 6/1962 | Carson et al. | 137/625.15 |
| 3,422,848 | 1/1969 | Liebman et al. | 137/625.15 |
| 3,989,624 | 11/1976 | Wachsmuth | 210/34 |
| 4,202,765 | 5/1980 | Koff et al. | 210/31 |
| 4,491,567 | 1/1985 | Rapp et al. | 423/387 |
| 4,725,360 | 2/1988 | Fuchs et al. | 210/670 |
| 5,213,784 | 5/1993 | Cawlfield | 423/387 |

OTHER PUBLICATIONS

Holzapfel, Heinz, *Z. Anorg. und Allgem. Chemie*, vol. 288, p. 28, 1956.
Wheelwright, E.J. in *Industrial Engineering Chemistry Process Design Development*, vol. 16, No. 2, 1977, p. 220.

Primary Examiner—Peter O'Sullivan
Attorney, Agent, or Firm—Lois A. Gianneschi

[57] ABSTRACT

An improved ion exchange process for purifying and/or concentrating hydroxylamine from an aqueous solution comprising hydroxylammonium ion and counter anions wherein ion exchange process conditions including effluent pH, effluent conductivity, and ion exchange bed height can be monitored and used to identify when to switch from an ion exchange step feed to a water wash feed, and to switch from a desorbent step to a water rinse step.

18 Claims, 23 Drawing Sheets

METHOD FOR MANUFACTURING HYDROXYLAMINE

BACKGROUND OF THE INVENTION

(1) Field of the Invention

This invention is an ion exchange process for producing purified, and in some cases, concentrated solutions of hydroxylamine from a solution comprising hydroxyammonium ion, and ionic impurities including sulfate ions. The process relies on the precise control of ion exchange operational parameters such as feed flow rate, wash and desorption temperature, liquid flow linear velocity, as well as the precise monitoring of ion exchange effluent stream parameters such as conductivity, and/or pH to identify when various ion exchange process steps should begin and end.

(2) Description of the Art

Hydroxylamine is prepared commercially by the Raschig process or variations thereof in which ammonium or sodium nitrite is reacted in aqueous solution with ammonium or sodium bi-sulfite and sulfur dioxide and the resulting disulfonate salts are subsequently hydrolyzed to a solution containing essentially hydroxylammonium sulfate, sulfuric acid, ammonium sulfate and/or sodium sulfate plus minor amounts of the corresponding nitrates. This solution can be used, after neutralization with ammonia, as a source of hydroxylamine, e.g. for the synthesis of oximes from ketones. However, there is no simple method for isolating pure hydroxylamine or pure hydroxylammonium salts from the mixture.

One method for obtaining pure hydroxylammonium salts consists of using a hydroxylammonium containing mixture to synthesize an oxime from a ketone, separating the oxime from the spent solution and hydrolyzing this oxime with a strong mineral acid to recover hydroxylammonium salt and the ketone which can be recycled. This method uses long periods of heating for the hydrolysis and requires expensive equipment for the separation of the oxime from the spent solution and of the hydroxylammonium salt from the ketone. Moreover, salts of hydroxylamine with weak or oxidizing acids cannot be prepared by this method because these acids either do not effect hydrolysis of oximes or decompose the hydroxylammonium salt formed during hydrolysis. Salts of such acids can be prepared by neutralizing cold solutions of hydroxylamine with the corresponding acid.

Heinz Holzapfel in Z. Anorg. und Allgem. Chemie, Vol. 288, page 28 (1956) describes the preparation of hydroxylamine from hydroxylammonium salts by employing an anion exchange resin in the OH form. This publication does not relate to the separation of hydroxylamine from solutions containing other cations. As disclosed in U.S. Pat. No. 3,508,864 issued Apr. 28, 1970 to Wallace T. Thompson et al., hydroxylammonium perchlorate can be produced either by liberating hydroxylamine from a hydroxylammonium salt by passage through an anion exchange resin and neutralizing with perchloric acid, or by absorbing hydroxylammonium ion on a cation exchange resin and then passing perchloric acid through the resin. This method does not separate hydroxylamine from other cations. A cation exchange method is described by Earl J. Wheelwright in Industrial Engineering Chemistry Process Design Development, Vol. 16 No. 2 (1977), page 220 for the preparation of hydroxylammonium nitrate. This method does not separate hydroxylamine from other cations and moreover the resulting solution of hydroxylammonium nitrate contains significant amounts of nitric acid.

Other methods for manufacturing, recovering, and concentrating hydroxylamine solutions and hydroxyammonium nitrate are known in the art. U.S. Pat. No. 5,213,784 discloses a process for producing concentrated purified hydroxylammonium nitrate. The process involves admixing nitric acid having a concentration less than about 70% to solutions containing excess hydroxylamine. The process avoids spontaneous decomposition of the product.

U.S. Pat. No. 4,725,360 discloses a process for recovering hydroxylamine from waste water in the form of hydroxylammonium sulfate. The process consists of passing the waste water over a strongly acidic ion exchanger and then eluting hydroxylamine associated with the ion exchanger with sulfuric acid.

U.S. Pat. No. 4,202,765 discloses a method for purifying hydroxylamine using an ion exchanger. The process consists of passing a hydroxylamine containing solution across a bed of cationic exchange resin and desorbing absorbed hydroxylamine using a monovalent amine or hydroxide base.

The prior art describes methods for preparing hydroxylamine and hydroxylammonium salts, but there is still a need for a simple, inexpensive, and continuous process for seperating hydroxylamine from solutions containing ionic contaminants. There is also a great need for a process that is capable of producing a hydroxylamine solution containing essentially no anion impurities such as sulfates.

SUMMARY OF THE INVENTION

An object of this invention is to provide a process for manufacturing an aqueous hydroxylamine product that is operated at conditions that do not degrade hydroxylamine.

Another object of this invention is to provide a process for producing an aqueous hydroxylamine product that contains essentially no anionic contaminants.

Still another object of this invention is to provide a process that produces an essentially pure aqueous hydroxylamine product.

A further object of this invention is to provide a continuous process for producing a hydroxylamine product by ion-exchange whereby the concentration of the essentially pure hydroxylamine in the product is greater than the concentration of the hydroxylamine in the feed.

Yet another object of this invention is a process for manufacturing a pure aqueous hydroxylamine product in which process column effluent parameters such as pH, effluent conductivity, and ion exchange column resin bed height are monitored and used to control the transition from one ion exchange step to the next in order to provide an essentially pure non-degraded aqueous hydroxylamine product.

In one embodiment, this invention is a process for purifying hydroxylamine from a aqueous solution comprising hydroxylammonium ion and ionic contaminants. The process begins by introducing an aqueous feed solution including hydroxylammonium ion and other ionic contaminants into an ion exchange column containing at least one cation exchange resin. When hydroxylammonium ion is detected in a column effluent stream, the feed has broken through, and the hydroxylammonium ion containing feed is stopped. Deionized water is next introduced into the ion exchange column to give a water wash effluent stream. The deionized water feed is halted when the wash water effluent stream is essentially free of ionic contaminants present in the feed. After the wash water feed is halted, an aqueous desorbent is fed into the ion exchange column. The aqueous desorbent will comprise water and desorbent that is capable of desorbing hydroxylammonium ion from the cation exchange resin. The aqueous desorbent is fed into the ion exchange column in an amount and concentration sufficient to desorb at least some hydroxylammonium ion from the cation exchange resin. Next, rinse water is fed into the ion exchange column to give an ion exchange column desorption effluent stream that is collected to obtain an aqueous solution of essentially pure hydroxylamine and containing essentially no anion contaminants. Desorption effluent collection is halted as soon as significant amounts of ionic contaminants are detected. Rinse water is continued to the column until the column effluent is essentially free of hydroxylamine and ionic contaminants.

In another embodiment, this invention is a process for purifying hydroxylamine from a Raschig solution. The process begins by feeding an aqueous solution including hydroxylammonium ion, hydrogen ions, aminonium ions, and anion contaminants into an ion exchange column containing at least one cation exchange resin. The feed is halted when the ion exchange column effluent conductivity exceeds about 150 mMhos/cm and a deionized water wash feed is introduced into the ion exchange column to give a first ion exchange column water wash effluent stream. The water wash feed is halted when the ion exchange column effluent conductivity reaches about 0 mMhos/cm. Next, an aqueous desorbent solution comprising ammonium hydroxide having a normality of at least 7.2 is fed into the ion exchange column. The aqueous desorbent feed is halted and a rinse water feed is started. The desorbent product emanating from the ion exchange column is collected when the effluent conductivity rises above about 0 mMhos/cm to give an aqueous product stream of essentially pure hydroxylamine and containing essentially no ionic contaminants. Collection of the aqueous desorbent stream is halted when the effluent conductivity rises above about 0.15 mMhos/cm.

DESCRIPTION OF THE DRAWINGS

There is shown in the drawings a presently preferred embodiments of the ion-exchange process for purifying hydroxylamine of this invention wherein.

DESCRIPTION OF THE CURRENT EMBODIMENT

Figure 1:
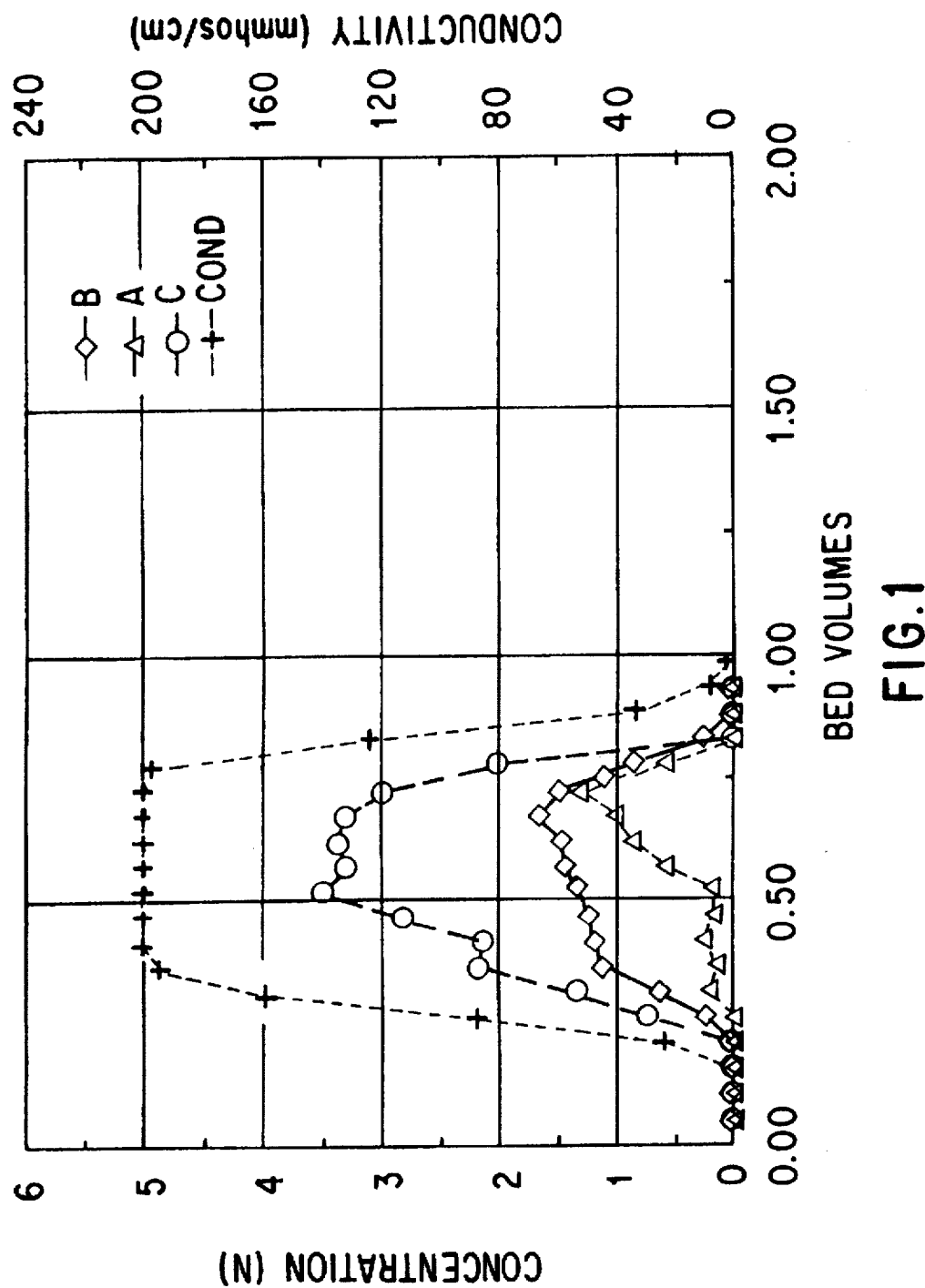
FIG. 1 is the conductivity profile of an ion exchange step followed by a water wash step wherein (..+..) is conductivity, (-+-) is free acid ion concentration, ($\Delta$) is hydroxylammonium ion concentration, and (o) is ammonium ion concentration.

The present invention relates to an ion-exchange process for purifying hydroxylamine from an aqueous solution including hydroxylammonium ion and ionic contaminants such as $N^+$, $NH_4^+$ and sulfates.

The ion-exchange process of this invention is useful for producing a high purity aqueous hydroxylamine solution for subsequent manufacture of hydroxylamine salts such as hydroxylamine nitrate as well as hydroxylamine sulfate, and other hydroxylamine salts for various intermediate and end uses. An additional advantage of the process of this invention is its ability to produce a purified aqueous hydroxylamine product that is essentially free of ionic contaminants as well as anionic contaminants such as sulfates. The term "essentially free" as used herein, refers to a purified aqueous hydroxylamine product that has less than 10 ppm anionic contaminants such as sulfates and preferably 5 ppm or less of anionic contaminants. The term "essentially free" when used to describe ionic contaminants means less than 200 ppm ionic contaminants including cationic and anionic contaminants.

The ion exchange process of this invention is useful for purifying and concentrating hydroxylammonium ions produced in a variety of processes. Such processes are disclosed and described, for example, in U.S. Pat. Nos. 5,213,784 and 4,491,567 which describe processes for producing hydroxylammonium ion salts such as hydroxylammonium nitrate (HAN), and hydroxylamonium sulfate (HAS), and which are incorporated herein by reference. A common process for preparing a hydroxylammonium ion containing solution is the Raschig process. The Raschig process produces an aqueous solution comprising hydroxylammonium ions, hydrogen ions, ammonium ions, and sulfates.

The process of this invention is useful for producing a purified and in some instances concentrated aqueous hydroxylamine solution from any aqueous hydroxylammonium ion containing solution, including, but not limited, Raschig solutions, HAN solutions and HAS solutions. However, the process of this invention will generally be described in the context of purifying and concentrating hydroxylamine from the aqueous hydroxylammonium ion containing solution product of the Raschig process.

The process of this invention uses an ion-exchange column loaded with a cation exchange resin to bind to the hydroxylammonium ion in order to accomplish hydroxylamine purification. All types of cation exchange resins are suitable, e.g. sulfonic, phosphoric or carboxylic types. Sulfonic resins are preferred because they have a very low affinity for protons and consequently it is possible to feed the relatively strongly acidic technical solutions available through the Raschig process directly onto the resin without feed pretreatment.

For displacing hydroxylammonium ion from the resin, any water soluble monovalent amine or hydroxide base can be used. Polyvalent bases are less suitable because their cations have great affinity for the exchange sites of the cationic resin and therefore cannot be readily displaced by hydroxylammonium ion in a subsequent ion-exchange loading cycle. Suitable monovalent bases include, for example, sodium hydroxide, potassium hydroxide lithium hydroxide and the like; methylamine, ethylamine, dimethylamine, diethylamine and the like. The preferred base is ammonium hydroxide which has the advantages of being relatively inexpensive, non-toxic, of low molecular weight, and volatile. Moreover, the by-product obtained when ammonia is used as a base for the recovery of hydroxylamine from a mixture of sulfate salts is ammonium sulfate, which is valuable as a fertilizer. A most preferred desorbent base is an aqueous ammonia solution having an ammonia normalcy of at least 7.0, and preferably a normalcy of at least 7.2.

The volatility of ammonia allows for the use of a slight excess of ammonia in the desorption step in order to displace hydroxylamine completely from the resin because small amounts of ammonia that will contaminate the product hydroxylamine (less than about 200 ppm) during this operation can easily be removed by evaporation. Furthermore, any product contaminated with an unacceptable level of ammonium ion can be recycled to the feed stream. We have found, however, that it is possible to obtain essentially ammonia-free and ionic contaminant free hydroxylamine solutions directly from the resin by using a deficient amount of ammonia to displace hydroxylamine.

The aqueous base solution which is used to desorb hydroxylamine from the ion exchange resin during the desorption step may optionally contain hydroxylamine. When the aqueous base solution includes hydroxylamine, the ion exchange column effluent which is thereafter finally obtained by subsequently washing the resin bed with water, contains hydroxylamine at a concentration which is substantially higher than the concentration obtained if no hydroxylamine were present in the aqueous base solution. This effect allows the recovery of relatively concentrated hydroxylamine liquors in a cyclic and/or continuous ion exchange process by simply recycling part of the hydroxylamine product solution to the unloading step of the next cycle after mixing with a base.

The ion exchange process of this invention is conducted in essentially four steps. The first two steps are defined as the "loading steps" and consist of: (1) an ion exchange step in which a hydroxylammonium ion containing solution is passed across the cation exchange resin in order to allow the hydroxylammonium ion to bind to the cation exchange resin; and (2) a wash step whereby deionized water or some other wash solution is directed across the cation exchange resin in order to maximize the association of hydroxylammonium ion with the cation exchange resin. The water wash step also removes any non-exchanged ionic contaminants such as hydrogen ions, ammonium ions, and anionic contaminants such as anionic sulfates from the solution filling the void spaces between the cation exchange resin particles.

The final steps of the process are known as the "unloading steps". The unloading steps are: (3) a desorption step; and (4) a rinse step. The desorption step uses concentrated aqueous base solution comprising a soluble amine or hydroxide base that has a higher affinity towards the cationic exchange resin than hydroxylamine. The soluble amine or hydroxide base replaces hydroxylammonium ion on the cationic resin thereby desorbing hydroxylamine and making it available for collecting in the ion exchange column effluent stream. A rinse step follows the desorption step and uses deionized water or some other aqueous rinse Solution to elute the desorbed hydroxylamine from the ion exchange column where it is collected in a purified and, in some instances, a concentrated desorbent product. The rinse step also cleans the resin bed sufficiently so that no liquid phase reactions occur between the desorbent or eluted products and the subsequent feed.

Each step is described in greater detail below.

The Ion Exchange Step

A feed solution comprising hydroxylammonium ion and ionic impurities such as sulfate or nitrate impurities is fed into through a column of cation exchange resin during the ion exchange step. The feed solution may include other ionic contaminants such as hydrogen ion, ammonium ion, sulfate ion, nitrate ion, chloride ion, and phosphate ion. The type and amount of feed contaminants present will depend largely on the process used to manufacture the hydroxylammonium ion containing feed. The hydroxylammonium ion fed into the resin packed column is retained by the cation exchange resin until the resin is at least partially saturated with hydroxylammonium ion at which time the hydroxylammonium ion begins to appear in the column effluent and breakthrough is reached. This first method of loading the resin with hydroxylammonium ion until the breakthrough point is reached represents the maximum amount of hydroxylammonium ions that may be quantitatively removed by the ion cation exchange resin from the feed solution while minimizing loss of hydroxylammonium ion in the exchange step column effluent. Continuing hydroxylammonium ion feed into the resin packed column after hydroxylamine breakthrough occurs represents a second method of resin loading whereby hydroxylammonium ions appear in the column effluent stream in progressively larger concentrations until the mole-fraction of hydroxylammonium ion in the effluent approaches the mole-fraction of hydroxylammonium ion in the feed solution. The resin at this point is essentially at equilibrium with the feed solution and the hydroxylammonium oil loading on the cation exchange resin represents the equilibrium capacity of the resin for hydroxylamine ion in the presence of excess feed solution.

The second method for loading the cation exchange resin with hydroxylammonium ion described above maximizes the ability of the cationic exchange resin to load hydroxylammonium ion but it produces an unpurified effluent that contains large amounts of desired hydroxylammonium ion. This stream can be recycled to the feed stream if necessary.

It is preferred that the concentration of hydroxylammonium ion in the column effluent during the ion exchange step be minimized while maximizing the loading of hydroxylammonium ion on the cationic exchange resin. This is accomplished by carefully monitoring various parameters of the effluent stream emanating from the ion exchange column during the ion exchange step. It has been discovered that the effluent conductivity and the effluent pH are good indicators of imminent hydroxylamine breakthrough. Specifically, it has been discovered that hydroxylammonium ion breakthrough is imminent when the ion exchange column effluent stream conductivity reaches from about 150 to about 250 mMhos/cm. The conductivity level at which the ion exchange step is halted will depend upon the solution hydroxylammonium ion concentration. For example, a Raschig solution fee will be halted at an effluent conductivity of about 150 mMhos/cm while a 30–40 weight percent solution of HAS will be fed into the column until the effluent conductivity reaches about 250 or more mMhos/cm. When the conductivity of the effluent stream reaches the preferred range, the ion exchange step is halted and water wash is begun.

Alternately, the ion exchange column effluent stream pH can be monitored to determine when hydroxylammonium ion breakthrough is imminent and the ion exchange step should be halted. It has been discovered that the pH of the ion exchange column effluent stream drops from about 5.0–7.5 to about 2.0–2.5 when hydroxylamine stream containing hydrogen and ammonium ions begins to break through the cation exchange resin in the ion exchange column. Thus, when the ion exchange column effluent pH reaches from about 2 to about 2.5, the ion exchange step is preferably halted and the water wash step begun.

Another important ion exchange step operating parameter is the temperature of the feed solution that is fed to the ion exchange column during the ion exchange step. Hydroxylamine is very sensitive to temperature and it can degrade at elevated temperatures and contaminate the hydroxylammonium ion containing ion exchange column feed as well as the purified hydroxylamine product. Therefore, it is important to maintain the temperature of the hydroxylamine containing feed to the ion exchange column at a temperature from about 25° to about 50° C. Another important column operating parameter is the feed liner velocity which should be controlled at from about 2.0 to about 5.0 cm/min.

The Water Wash Step

The cation exchange resin that is loaded in an ion exchange column useful in the process of this invention will typically be a particle in the form of a granule or a spherical pellet. As a result, there are spaces between particles that are occupied by any fluid fed into the ion exchange column during the various process steps. During the ion exchange step, the hydroxylammonium ion and anionic contaminant containing feed occupies the void spaces between the cation exchange resin particles and must be flushed from the column prior to desorbing hydroxylammonium ion from the resin in order to prevent anionic contaminants and other feed contaminants from contaminating the essentially pure aqueous hydroxylamine product.

It is desirable to use as little deionized wash water as possible in order to flush essentially all of the unwanted ionic contaminants from the ion exchange column prior to desorbing hydroxylamine from the cation exchange resin. We have determined that the amount of wash water used in the wash water step can be minimized and the purity of the resulting desorbed hydroxylamine product can be maximized by closely controlling the wash liquid temperature and linear velocity and by closely monitoring the ion exchange column effluent conductivity and/or pH during the water wash step in order to identify when the water wash step should be ended and the desorbent step begun.

The conductivity of the ion exchange effluent stream during the water wash step is an indication of the amount of ionic impurities that are in the water wash effluent stream. It has been determined that the water wash step is optimally ended when the conductivity of the water wash effluent stream from the ion exchange column drops below about 0.10 mMhos/cm. At this point, essentially all impurities have been washed from the ion exchange column and the desorbent step is ensured to produce a high purity hydroxylamine solution. Alternatively, the pH of the ion exchange column effluent stream may be monitored during the water wash step and the water wash step is optimally halted when the pH increases from about 2.0 to from about 3.5 to about 4.0.

The water wash feed temperature and space velocity are important parameters which can be controlled during the water wash step to minimize water wash feed volume. We have found that heating the deionized water used in the water wash step to from about 35° to about 50° C. improves the efficiency of the water wash step by increasing the kinetics and solubility of ionic contaminants in the deionized water. The wash water can be cooled during the later stages of water wash step to quench the column if subsequent heat generated during desorption is too great. We have also found that the linear velocity of the water flowing through the ion exchange column during the water wash step should be controlled at from 4 to 20 cm/min based upon the cross-sectional area of the ion exchange column. Upon completion of the water wash step, the column is ready for the desorption step.

The Desorption Step

The purpose of the desorption step is to feed a desorbent solution into the ion exchange column that includes ions that will preferentially replace hydroxylammonium ion at the cationic exchange resin binding sites thereby eluting hydroxylamine from the resin and from the column. As discussed above, useful desorbents are preferably monovalent amine bases, hydroxide bases, or any combination thereof.

A preferred desorbent is aqueous ammonium hydroxide having a normality of from about 7.0 to about 14.0. It is most preferred that the aqueous ammonium hydroxide solution have a normality of at least 7.2. The aqueous ammonium hydroxide solution is added to the washed ion exchange column at a linear velocity of from 1.5 to 2.5 cm/min. It is important to maintain this low linear velocity of the desorbent solution in order to ensure that hydroxylamine is efficiently and completely desorbed from the cation exchange resin. It is also preferred that a predetermined amount of desorbent be added to the washed ion exchange column. The amount of desorbent used will depend upon the ion exchange resin used, the desorbent, and upon the desorbent concentration. For example, where a 7.2 normal solution of aqueous ammonium hydroxide is used as a desorbent, an amount of desorbent equal to 0.5 to 0.7 milliequivalents of ammonium hydroxide per milliliter of resin should be added during the desorption step. The temperature of the desorbent stream can also be adjusted for thermal control of the heat generated during desorption.

At the end of the desorption step, the ion exchange column contains enough desorbent material to desorb bound hydroxylamine from the cation exchange resin. However, the volume of desorbent added to the ion exchange column is generally very small and hydroxylamine does not typically appear in the ion exchange column effluent stream while desorbent is added to the ion exchange column. Therefore, a rinse step is necessary to propel the desorbent through the column so as to completely desorb hydroxylamine from the cation exchange resin and to prepare the cation exchange resin for a subsequent ion exchange step.

The Rinse Step

The rinse step performs two functions. It moves hydroxylamine out of the column and into the effluent stream from the ion exchange column and it prepares the ion exchange column for a subsequent sequence of ion exchange steps. The most important aspect of controlling the rinse step is to determine when to begin collecting a hydroxylamine containing ion exchange column effluent stream product and when to halt collecting the hydroxylamine containing ion exchange effluent stream product in order to maximize the volume and concentration of the hydroxylamine product while minimizing any contaminants in the collected product. We have discovered that by closely controlling rinse parameters such as rinse water temperature and linear velocity and by monitoring the ion exchange column effluent stream parameters such as conductivity and pH, we can maximize the purity and concentration of hydroxylamine in the effluent stream emanating from the ion exchange column during the rinse step.

It is preferred that the rinse step be performed using deionized water heated to from about 35° to about 50° C. The heated water increases the kinetics and solubility of contaminants and improves desorption kinetics as well. The linear velocity of the rinse water fed to the ion exchange column during the rinse step should be maintained at from about 2.0 to about 5.0 cm\min.

It is preferred that the effluent stream from the ion exchange column during the rinse step be collected as soon as hydroxylamine is detected in the effluent stream. This occurs when the conductivity increases above about 0.01 to about 0.05 mMhos/cm. The hydroxylamine containing effluent stream is then collected until the conductivity reaches from about 0.40 to about 0.70 mMhos/cm at which time desorbent begins to become detectable in the column effluent stream. The conductivity range over which essentially pure hydroxylamine is collected will depend on the concentration of the hydroxylamine product. Where a Raschig solution is used, the hydroxylamine containing column effluent stream will be collected until the effluent conductivity of about 0.4 mMhos/cm is reached. Where a 30 –40 weight percent HAS solution is being purified, he effluent conductivity of the effluent stream is collected until the conductivity surpasses about 0.7 mMhos/cm.

Figure 13:
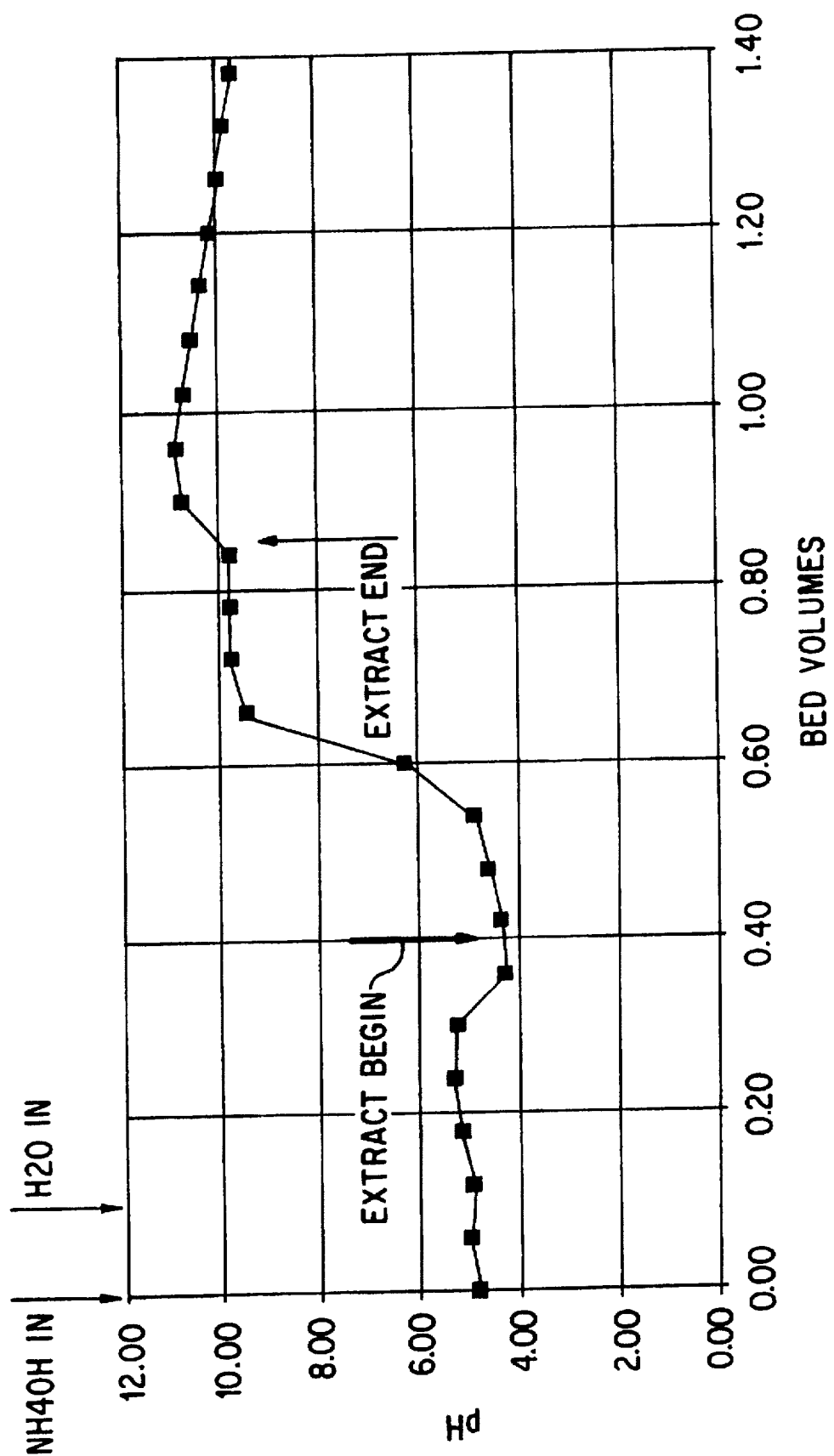
FIG. 13 is the pH profile versus resin bed volumes plot during the desorption cycle at high linear velocity—2.55 cm\min—of the hydroxylamine ion exchange process described in Example 3.

The ion exchange column bed height and/or the effluent stream pH are alternate measures for determining when to begin and end pooling the hydroxylamine containing effluent stream from the ion exchange column. The column ion exchange resin bed height begins to increase as hydroxylamine breaks through into the column effluent stream. Therefore, collection of the column effluent stream may begin when an ion exchange column resin bed height increase is first detected. The collection should end when the bed height remains the same after from about 0.3 to about 0.5 bed volumes of rinse water has been added to the ion exchange column.

pH monitoring can also be used to identify when to begin and end collecting the hydroxylamine containing ion exchange column effluent stream during the water wash step. As is shown in FIG. 13, the pH of the ion exchange column effluent stream begins to drop once the rinse step is begun. Ion exchange column extract effluent stream collection is begun when the pH reaches about 4.0 and begins increasing. The collection of the ion exchange effluent column stream is ended when the pH of the effluent stream reaches from about 9.9 to about 10.

By closely controlling the temperatures and flow rates of the various ion exchange steps and by closely monitoring the selected column effluent stream parameters, the process of this invention is able to produce an essentially pure aqueous hydroxylamine containing product.

The cation exchange resin may be employed in the process in the form of a dense compact fixed bed which is alternatively contacted with the feed mixture and desorbent materials. In the simplest embodiment of the invention, the ion exchange resin is used in the form of a single static bed in a semi-continuous process. In another embodiment, two or more, and preferably four static ion exchange resin beds are used in association with appropriate valving so that the feed solution may be passed through one or more ion exchange resin containing beds while the desorbent solution is passed through one or more of the remaining static beds. The flow of feed solution and desorbent solution may be either tip or down through the resin bed. Furthermore, any conventional apparatus employed in static bed fluid-solid contacting may be used to accomplish the process of this invention.

Counter-current moving-bed or simulated moving-bed counter-current flow systems are preferably used in the process of this invention because they have a much greater separation efficiency than fixed adsorbent bed systems. In the moving-bed or simulated moving-bed process, the adsorption and desorption operations are continuously taking place which allows both continuous production of an extract and a raffinate stream and the continual use of feed and desorbent streams. The raffinate stream comprises feed impurities, desorbent, and so forth and is comparable to the effluent from the ion exchange step described above and to the water wash step effluent stream.

One preferred embodiment of this process utilizes what is known in the art as the simulated moving-bed counter-current flow system. The operating principles and sequence of such a flow system are described in U.S. Pat. No. 2,985,589, incorporated herein by reference. In such a system, it is the progressive movement of multiple liquid access points down an adsorbent chamber that simulates the upward movement of adsorbent contained in the chamber. Generally, only four of the access lines are active at any one time; the feed solution input stream, desorbent solution inlet stream, product outlet stream, and extract outlet stream access lines. Coincident with this simulated upward movement of the solid adsorbent is the movement of the liquid occupying the void volume of the packed bed of adsorbent. So that counter-current contact is maintained, a liquid flow down the adsorbent chamber may be provided by a pump. As an active liquid access point moves through a cycle, that is, from the top of the chamber to the bottom, the chamber circulation pump moves through different zones which require different flow rates. A programmed flow controller may be provided to set and regulate these flow rates. Furthermore, pH monitors and conductivity monitors can be associated with each effluent stream. The output from such monitors may be used to manually or automatically control the liquid access and effluent points in order to maximize the purity and concentration of the hydroxylamine product.

The active liquid access points effectively divide the adsorbent chamber into separate zones, each of which has a different function. The adsorption zone, zone 1, is defined as the ion exchange resin located between the feed inlet stream and the raffinate outlet stream. In this zone, the feed contacts the ion exchange resin, an extract component is adsorbed, and a raffinate stream is withdrawn. Since the general flow through zone 1 is from the feed stream which passes into the zone to the raffinate stream which passes out of the zone, the flow in this zone is considered to be a downstream direction when proceeding from the feed inlet to the raffinate outlet streams.

Immediately upstream with respect to fluid flow in zone 1 is the purification zone, zone 2. The purification zone is defined as the ion-exchange resin between the extract outlet stream and the feed inlet stream. The basic operations taking place in zone 2 are the displacement from the non-selective void volume of the resin of any raffinate material carried into zone 2 by shifting of resin into this zone and the desorption of any raffinate material still bound to the surfaces of the resin particles. Purification is achieved by passing a portion of extract stream material leaving zone 3 into zone 2 at zone 2's upstream boundary, the extract outlet stream, to effect the displacement of raffinate material. The flow of material in zone 2 is in a downstream direction from the extract outlet stream to the feed inlet stream.

Immediately upstream of zone 2 with respect to the fluid flowing in zone 2 is the desorption zone or zone 3. The desorption zone is defined as the cation exchange resin between the desorbent inlet and the extract outlet stream. The function of the desorption zone is to allow a desorbent material which passes into this zone to displace the extract component which was bound upon the resin during a previous contact with feed in zone 1 in a prior cycle of operation. The flow of fluid in zone 3 is essentially in the same direction as that of zones 1 and 2.

In this process, an optional buffer zone, zone 4, is preferably utilized. This zone, defined as the cation exchange resin between the raffinate outlet stream and the desorbent inlet stream is located immediately upstream with respect to the fluid flow to zone 3. Zone 4 would be utilized to conserve the amount of desorbent utilized in the desorption step since a portion of the raffinate stream which is removed from zone 1 can be passed into zone 4 to displace desorbent material present in that zone out of that zone into the desorption zone. Zone 4 will contain enough resin so that raffinate material present in the raffinate stream passing out of zone 1 and into zone 4 can be prevented from passing into zone 3 thereby contaminating extract stream removed from zone 3. In the instances in which the fourth operational zone is not utilized, the raffinate stream passed from zone 1 to zone 4 must be carefully monitored in order that the flow directly from zone 1 to zone 3 can be stopped when there is an appreciable quantity of raffinate material present in the raffinate stream passing from zone 1 into zone 3 so that the extract outlet stream is not contaminated.

A cyclic advancement of the input and output streams through the fixed bed of resin can be accomplished by utilizing a manifold system in which the valves in the manifold are operated in a sequential manner to effect the shifting of the input and output streams, thereby allowing a flow of fluid with respect to solid adsorbent in a counter-current manner. Another mode of operation which can effect the counter-current flow of solid adsorbent with respect to fluid involves the use of a rotating disc valve in which the input and output streams are connected to the valve and the lines through which feed input, extract output, desorbent input and raffinate output streams pass are advanced in the same direction through the adsorbent bed. Both the manifold arrangement and disc valve are known in the art. Specifically, rotary disc valves which can be utilized in this operation can be found in U.S. Pat. Nos. 3,040,777 and 3,422,848 which are incorporated herein by reference. Both of the aforementioned patents disclose a rotary type connection valve in which the suitable advancement of the various input and output streams from fixed sources can be achieved without difficulty.

In many instances, one operational zone will contain a much larger quantity of resin than some other operational zone. For instance, in some operations the buffer zone can contain a minor amount of resin as compared to the resin required for the exchange and purification zones. It can also be seen that in instances in which desorbent is used which can easily desorb extract material from the resin that a relatively small amount of resin will be needed in a desorption zone as compared to the resin needed in the buffer zone or adsorption zone or purification zone or all of them. Since it is not required that the resin be located in a single column, the use of multiple chambers or a series of columns is within the scope of the invention.

It is not necessary that all of the input or output streams be simultaneously used, and in fact, in many instances some of the streams can be shut off while others effect an input or output of material. The apparatus which can be utilized to effect the process of this invention can also contain a series of individual beds connected by connecting conduits upon which are placed input or output taps to which the various input or output streams can be attached and alternately and periodically shifted to effect continuous operation. In some instances, the connecting conduits can be connected to transfer taps which during the normal operations do not function as a conduit through which material passes into or out of the process.

EXAMPLES

During laboratory and pilot-plant experiments, we discovered monitoring methods for the hydroxylamine purification process which give an essentially pure hydroxylamine product. The following examples illustrate the process control methods.

Example 1

A 5.0 cm diameter by 120 cm long jacketed column was initially charged with 2,180 cm³ of wet absorbent (in de-ionized water) and heated to 50° C. An aqueous feed containing 1.90N $HA^+$, 4.40 $NH_4^+$ and 2.10N $H^+$ with sulfate counter ions was fed at a flow rate of 16 cm³/min (0.9 cm/min linear velocity). The conductivity of the effluent was continuously monitored. Cations in the effluent were also measured by collecting small samples of the solution at a fixed time interval. The conductivity (+) and concentration profiles are shown in FIG. 1. Once the breakthrough of ions occurred at 0.3 bed volume (BV), the feed was continued for an additional 0.17 BV, after which de-ionized water was fed into the column. This amount of feed was based on getting as much exchange as possible without wasting feed entrained in the void space. Once breakthrough occurred, the initial conductivity of 0.0 mMhos/cm increased to a level of 250 mMhos/cm. During this feeding of the ionic solution, the polymer resin shrank by 5–7%. Upon completely washing out the feed from the void space, the conductivity returned to zero and the adsorption cycle was complete. This cycle required 1.0 BV of fluid to be passed through the column and a time of 2 hours.

Figure 2:
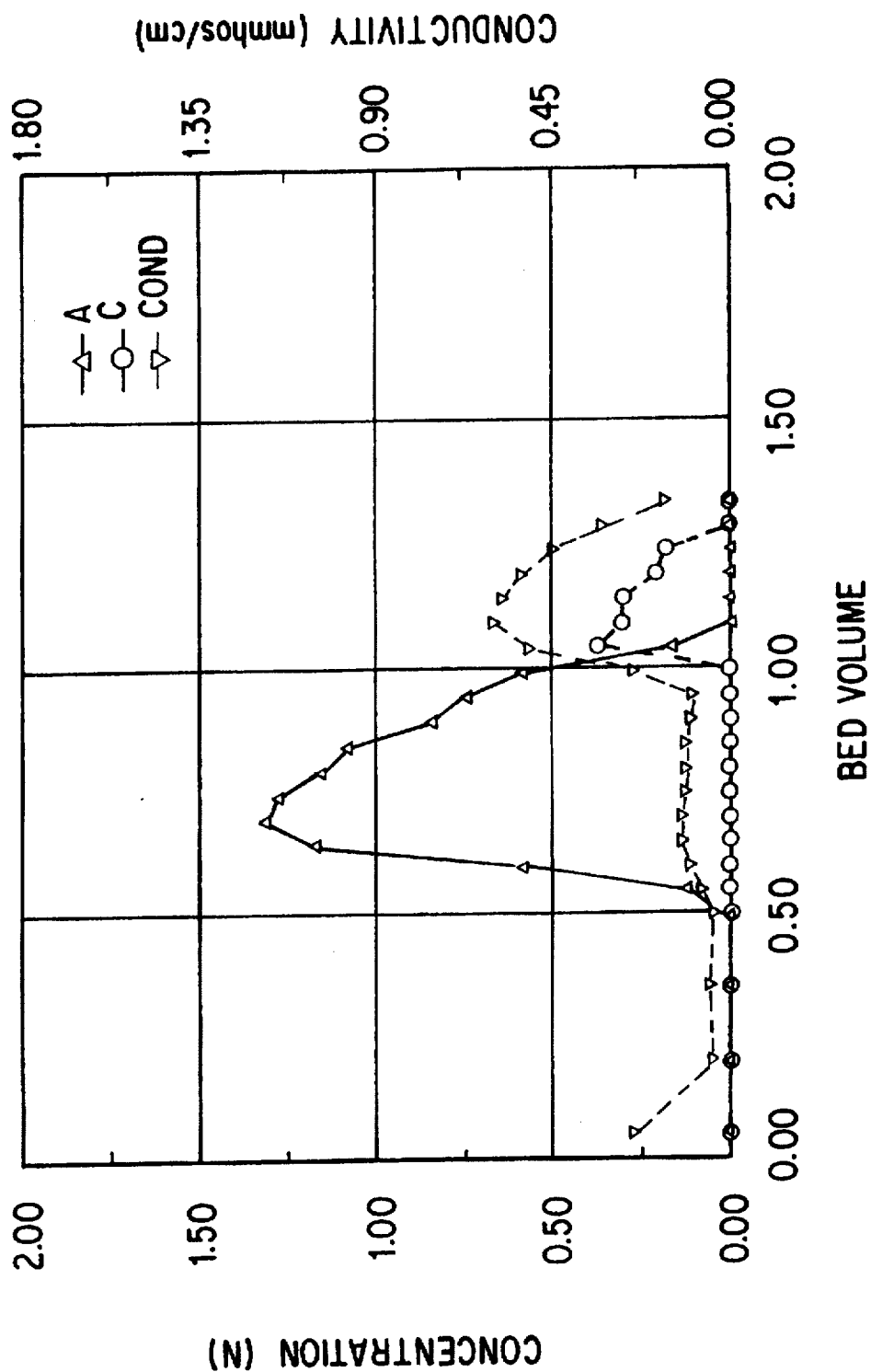
FIG. 2 is a concentration profile of an ion exchange column effluent during desorption at a linear velocity of 0.89 cm\min wherein ($\nabla$) is conductivity, ($\Delta$) is hydroxylammonium ion concentration, and (o) is ammonium ion concentration.

The desorption cycle began with a desorbent of 150 cm³ of ~7.0N $NH_4OH$ at a flow rate of 16 cm³/min. This is calculated as a slight excess of ammonium ions in order to exchange the $HA^+$ on the resin adsorbent. After the $NH_4OH$ is added, the desorbent is switched to a deionized water rinse and the conductivity was monitored to determine when to collect product. Concentration profiles of desorbed hydroxylamine (HA) and $NH_4^+$ were determined as shown in FIG. 2. At the beginning of the desorption cycle, the conductivity is zero. After 0.5 BV of fluid has been passed through the column, the desorbed HA begins to breakthrough. This is evidenced by an increase in conductivity to a level of about 0.10 mMhos/cm. At 0.5 BV, the product is collected until the $NH_4^+$ begins to breakthrough at 1.0 BV. The conductivity at this point sharply increased to above 0.4 mMhos/cm, at which point no more product is collected. The HA product collected had a concentration of 0.70N. The resin volume during the desorption cycle remains constant.

Example 2

Figure 3:
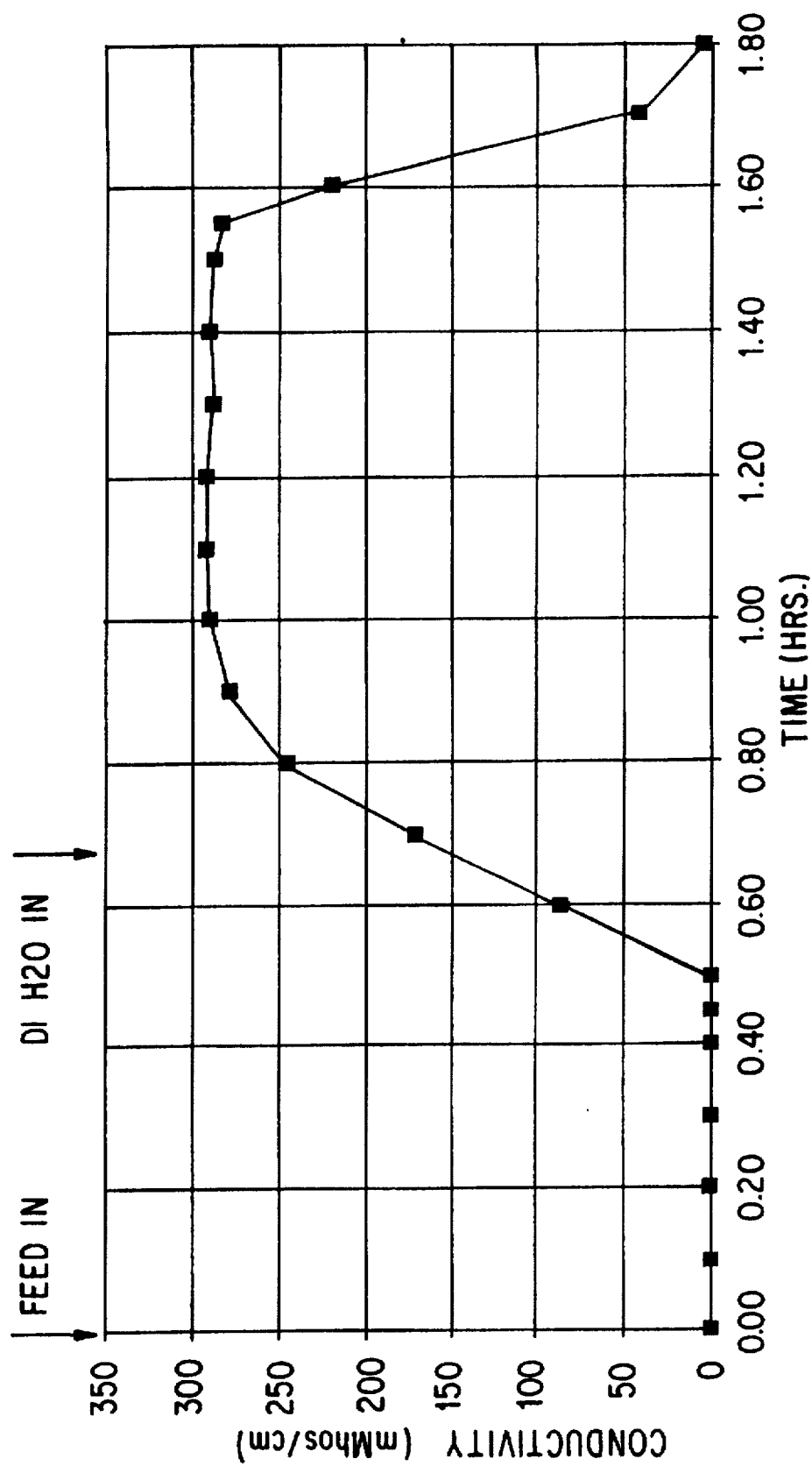
FIG. 3 is the conductivity profile versus time of the effluent stream from an ion exchange column during the absorption step and water wash step wherein each step was performed using a feed linear velocity of 1.07 cm\min.
Figure 4:
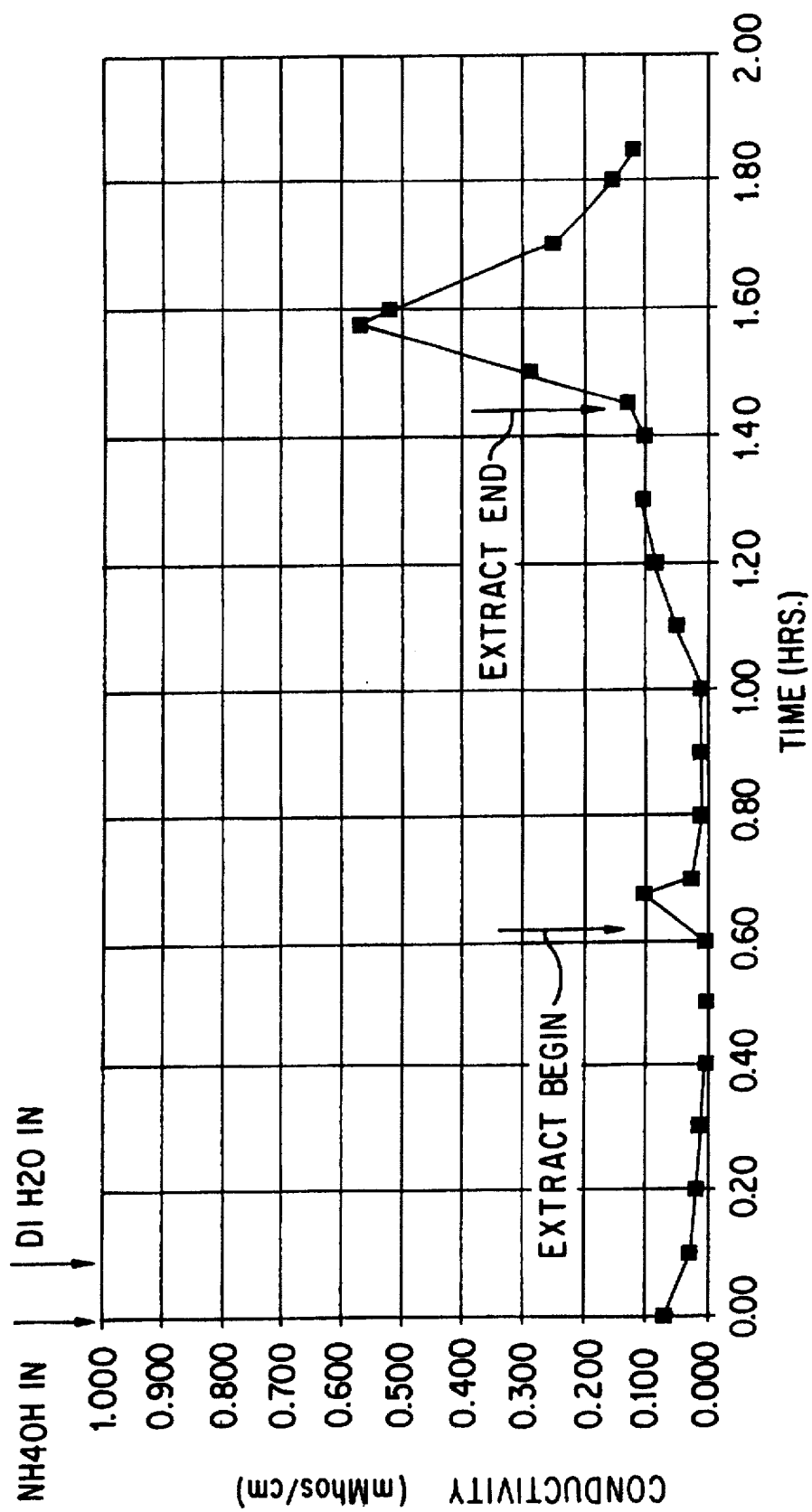
FIG. 4 is a desorption conductivity profile for the hydroxylamine purification process described in Example 2.
Figure 5:
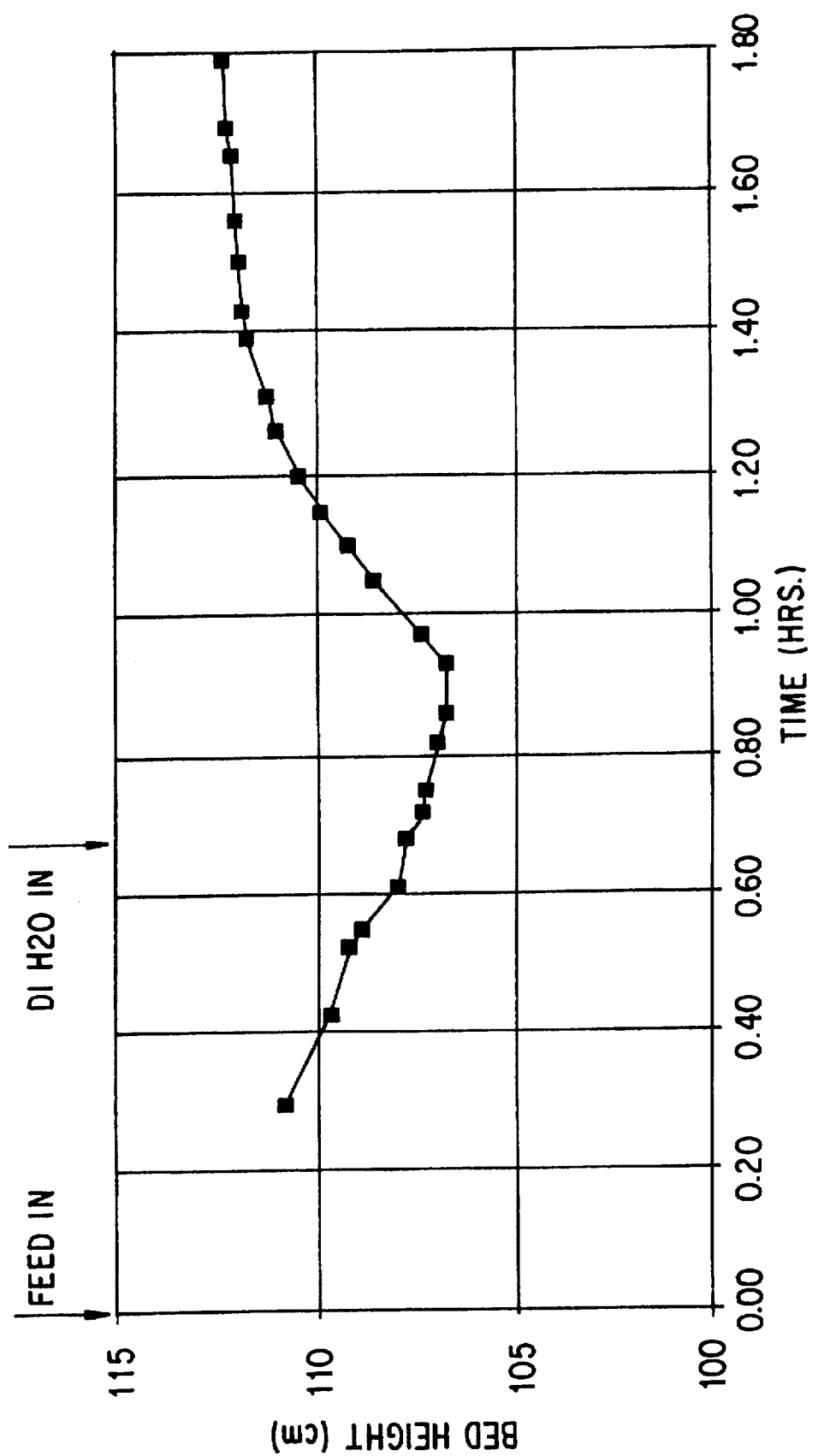
FIG. 5 is a bed height profile versus tine plot for the ion exchange cycle of the hydroxylamine ion exchange process described in Example 2.
Figure 6:
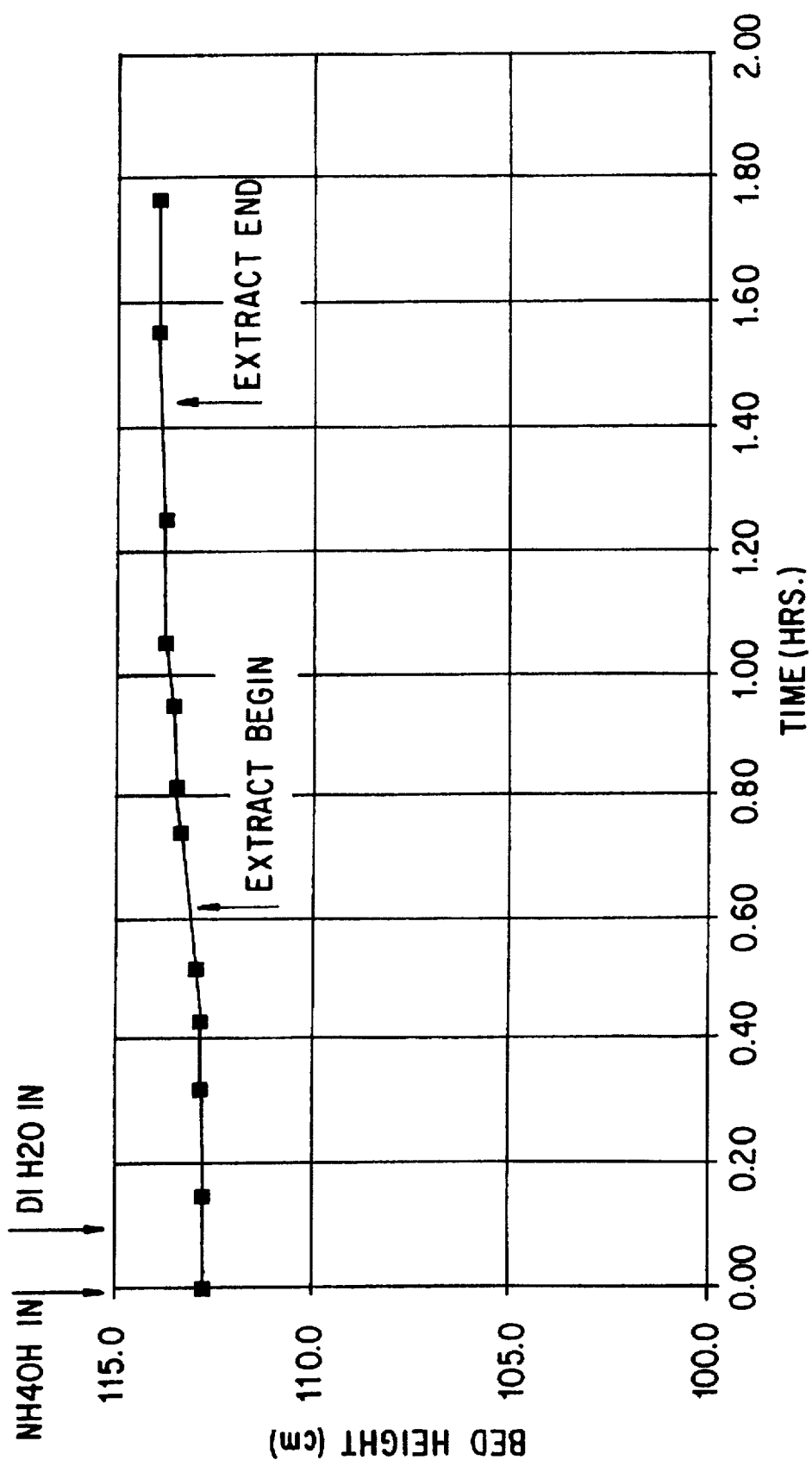
FIG. 6 is a bed height profile versus time plot of the desorption cycle of the hydroxylamine ion exchange process described in Example 2.
Figure 7:
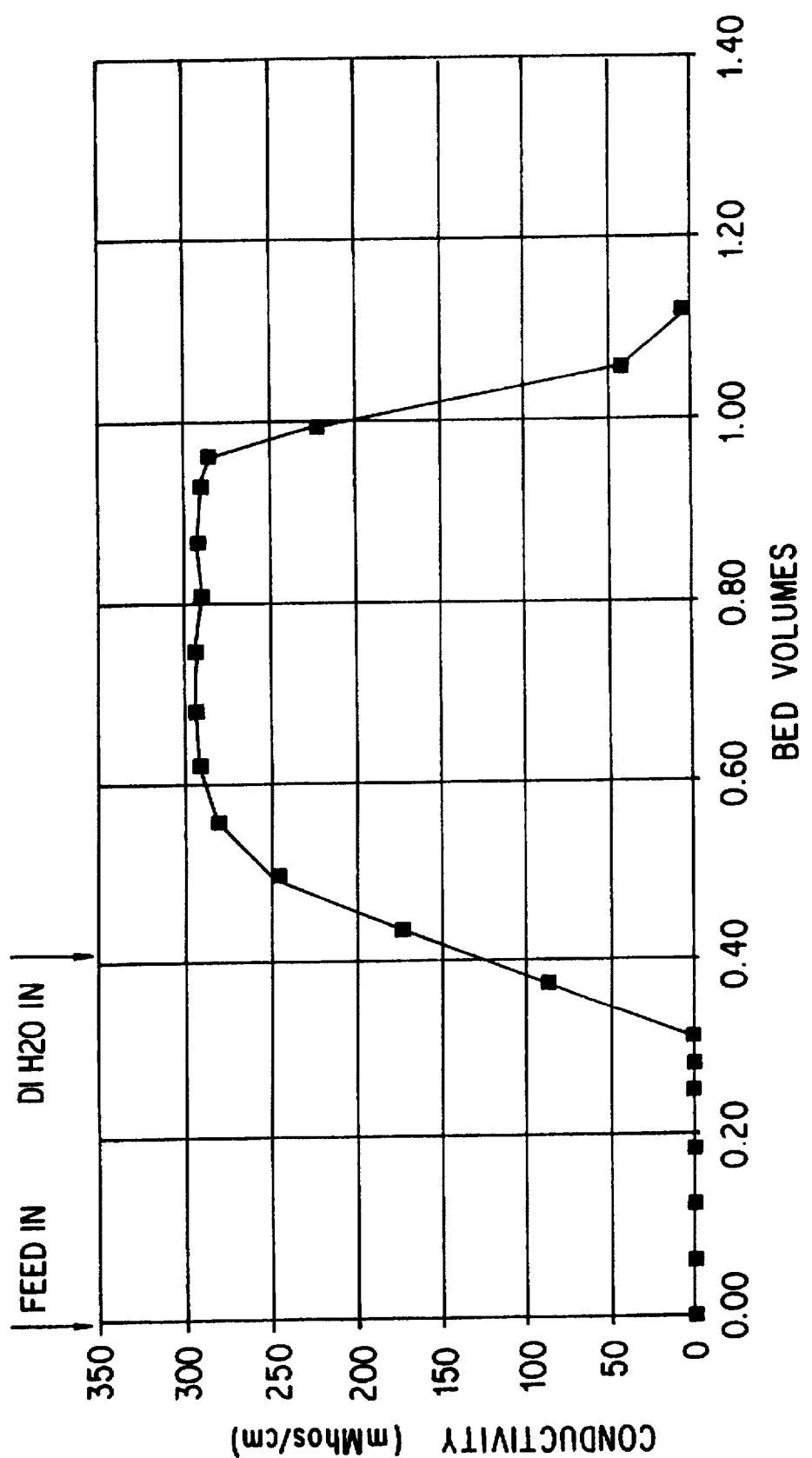
FIG. 7 is a conductivity profile versus resin bed volumes plot of the ion exchange absorption cycle of the hydroxylamine ion exchange process described in Example 2.
Figure 8:
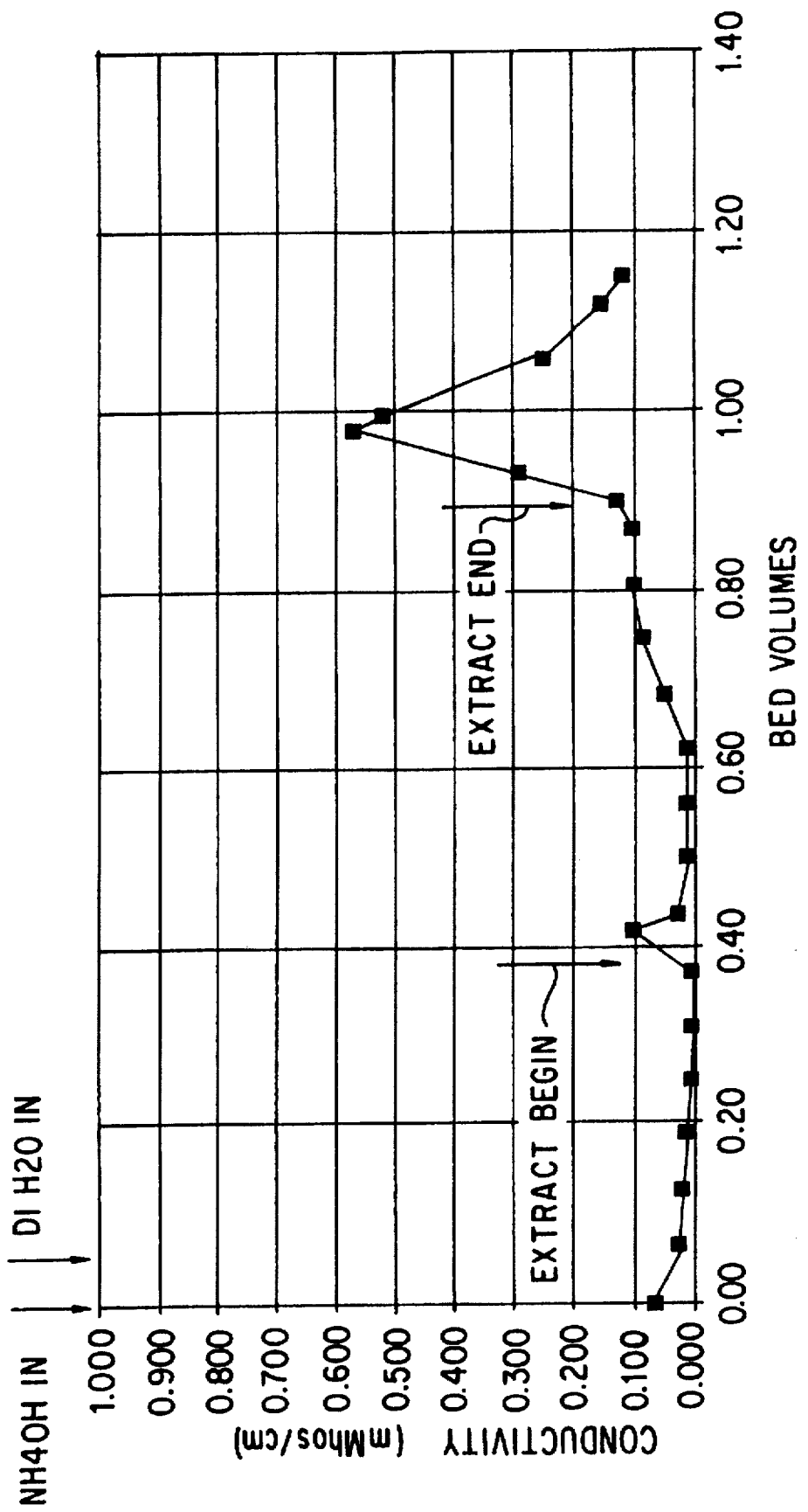
FIG. 8 is a conductivity profile versus resin bed volumes plot of the desorption cycle of the hydroxylamine ion exchange process described in Example 2.

A column of 5 cm diameter was loaded with 2,026 cm³ of wet resin adsorbent. Testing conditions were similar to those described in Example 1 except the flow rate was increased to 21 cm³/min (1.07 cm/min linear velocity). The conductivity profiles as a function of time during the ion-exchange and desorption cycles are reproduced in FIGS. 3 and 4 respectively. The changes in bed height are shown in FIGS. 5 and 6 while the conductivity profiles are plotted as functions of BV as shown in FIGS. 7 and 8. While the collection of the desirable HA (extract) can be determined by time or bed volume if the flow rate and the desorbent concentration are controlled accurately, the use of conductivity is more effective for the monitor and the control of the purification process. The concentration of the HA product was 0.69N.

Example 3

Figure 9:
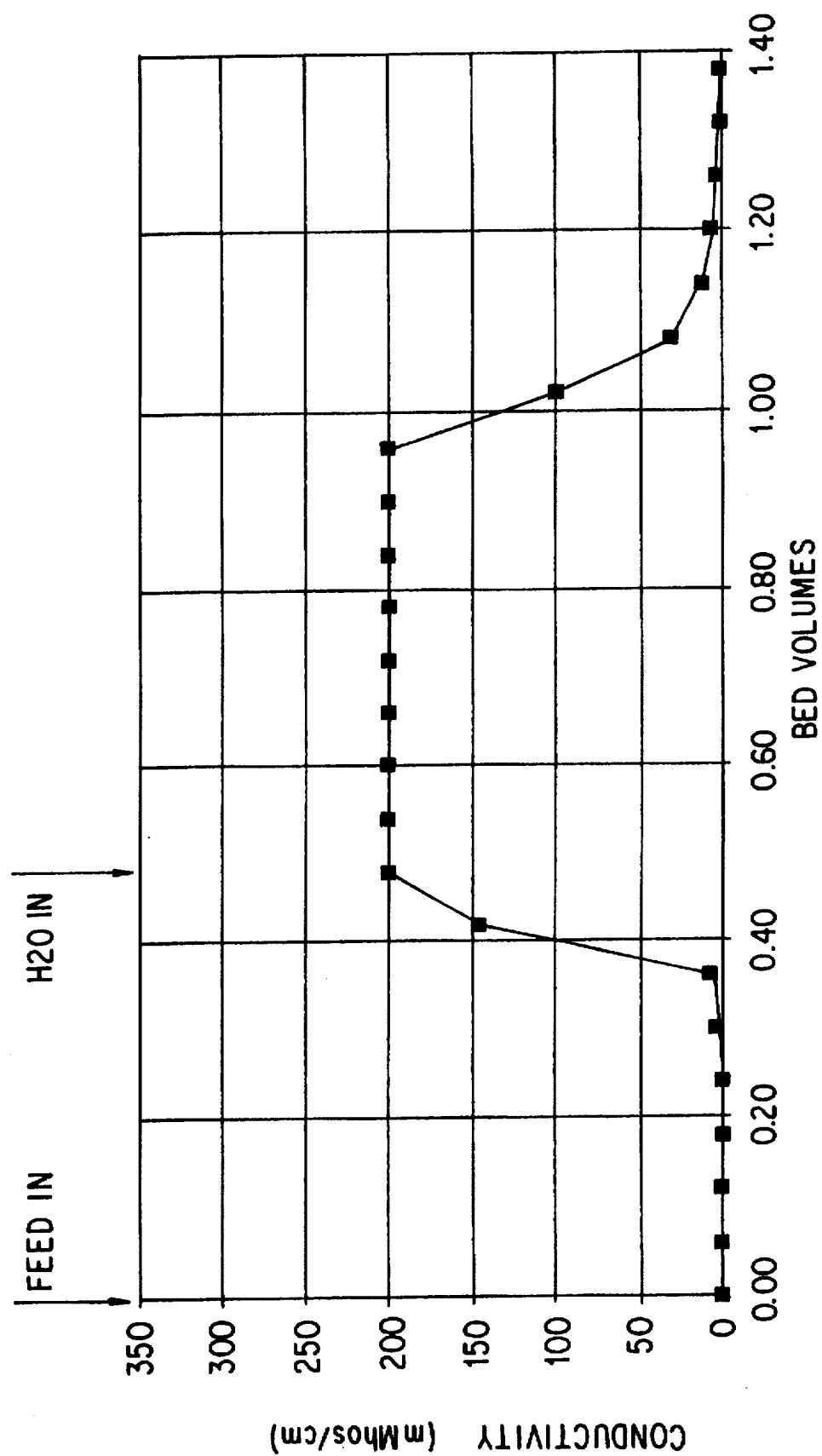
FIG. 9 is the conductivity profile versus resin bed volume of the hydroxylamine ion exchange desorption step at a high linear velocity—2.55 cm\min—of the hydroxylamine ion exchange process described in Example 3.
Figure 10:
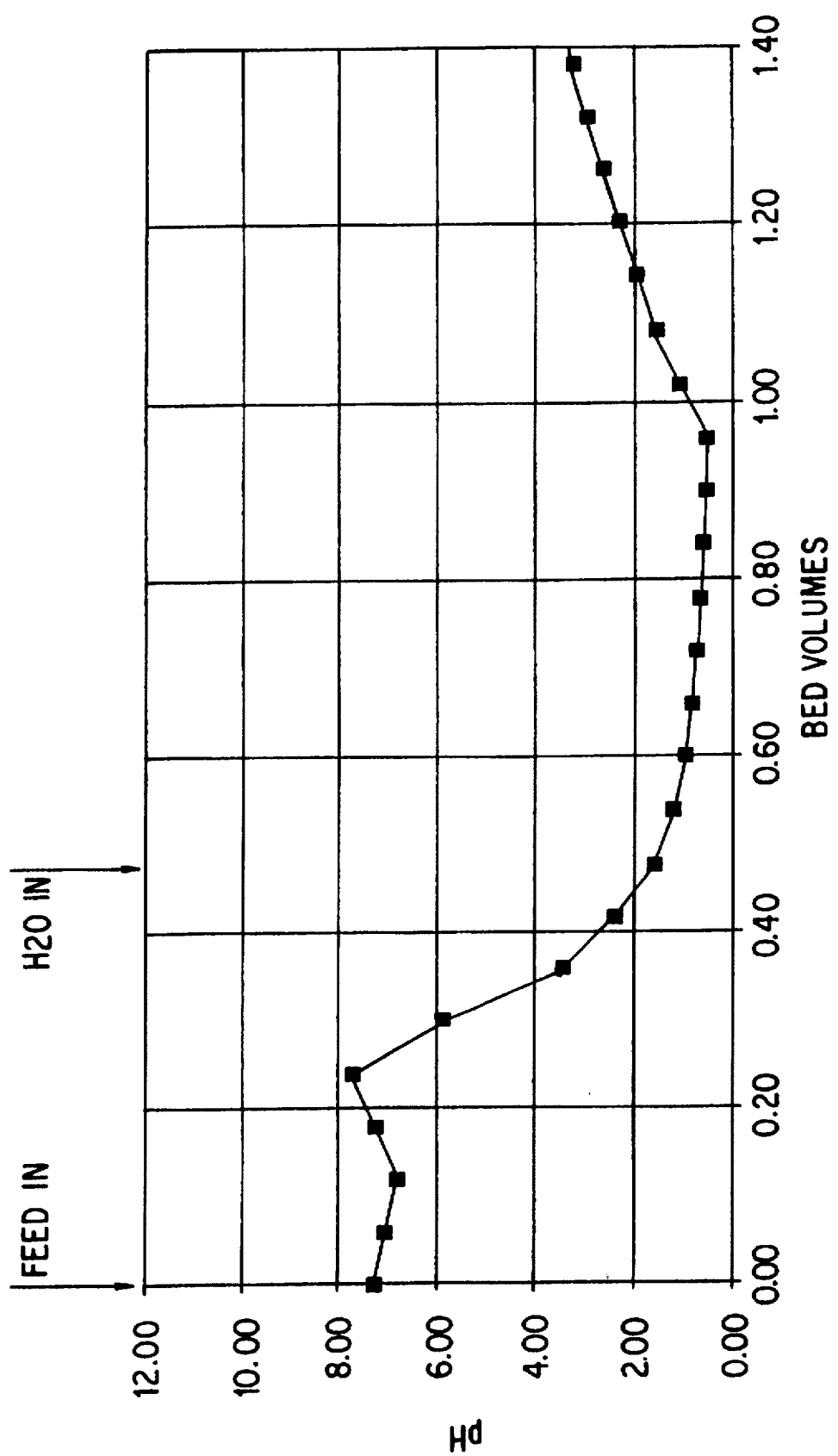
FIG. 10 is the pH profile versus resin bed volumes plot of the ion exchange absorption cycle at a high linear velocity—2.55 cm\min—of the hydroxylamine ion exchange process described in Example 3.
Figure 11:
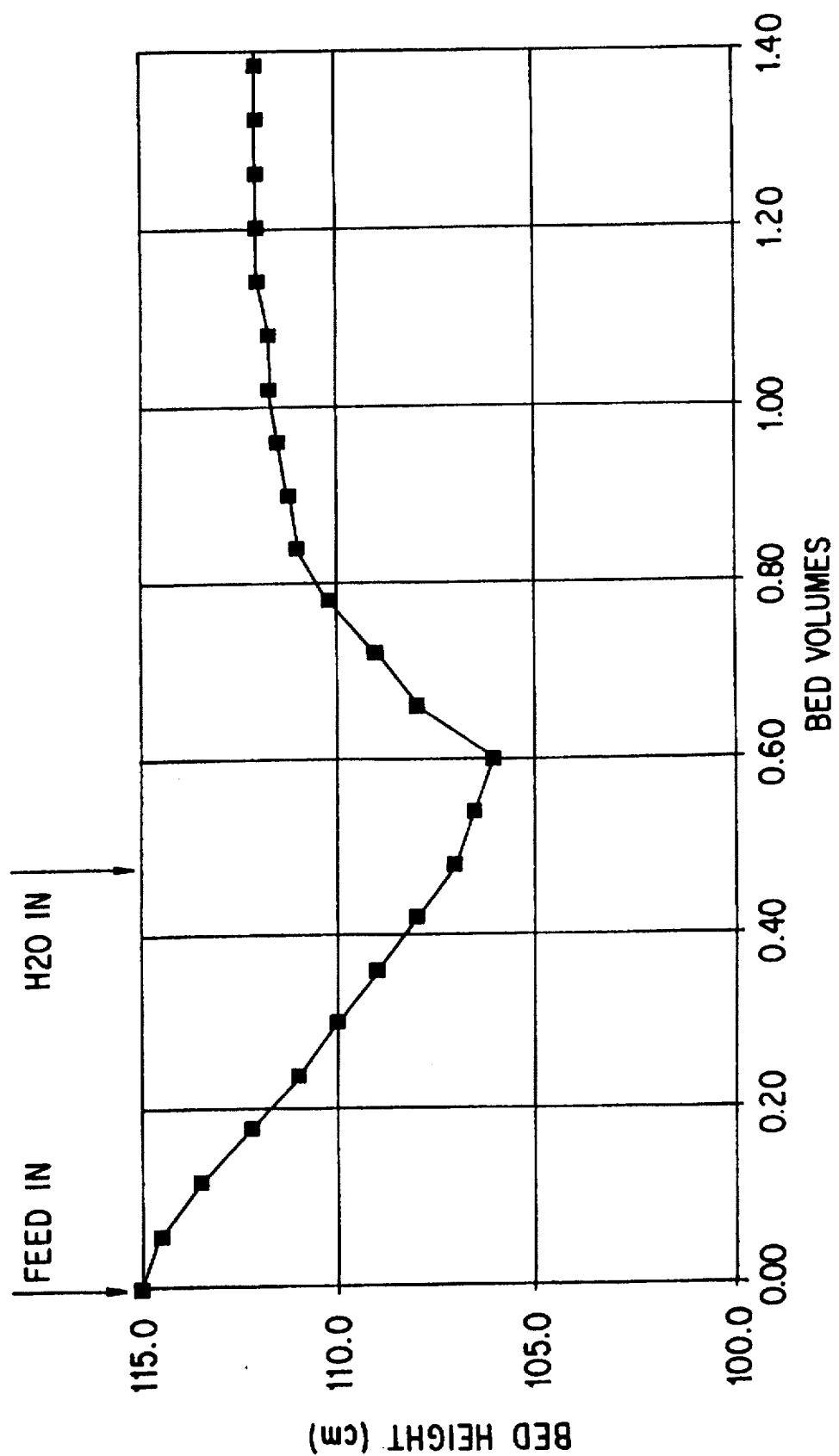
FIG. 11 is a plot of bed height profile versus resin bed volumes plot during the ion exchange absorption cycle at high linear velocity—2.55 cm\min—of the hydroxylamine ion exchange process of Example 3.
Figure 12:
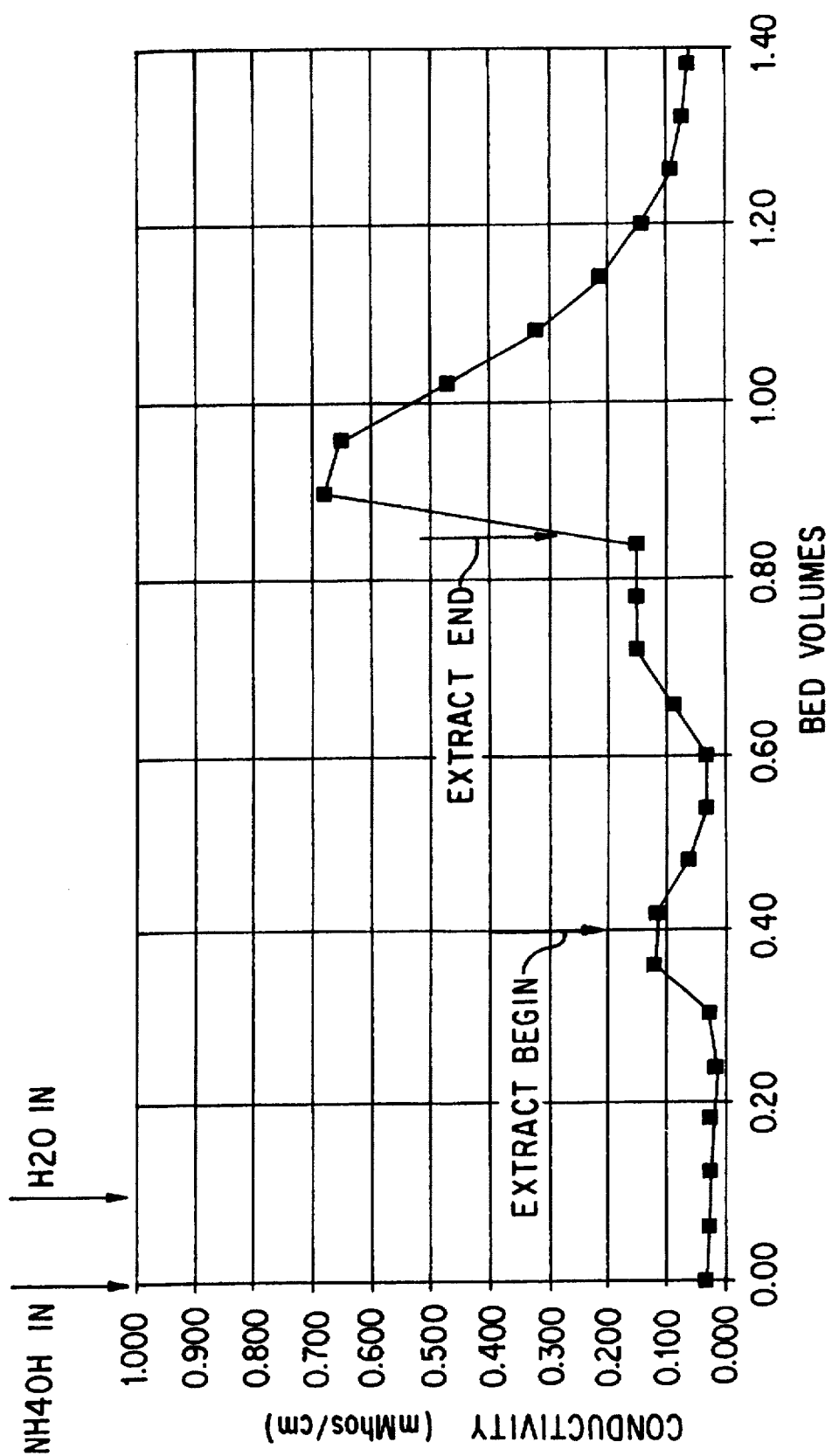
FIG. 12 is the conductivity profile versus resin bed volumes plot during the desorption cycle at high linear velocity—2.55 cm\min—of the hydroxylamine ion exchange process described in Example 3.
Figure 14:
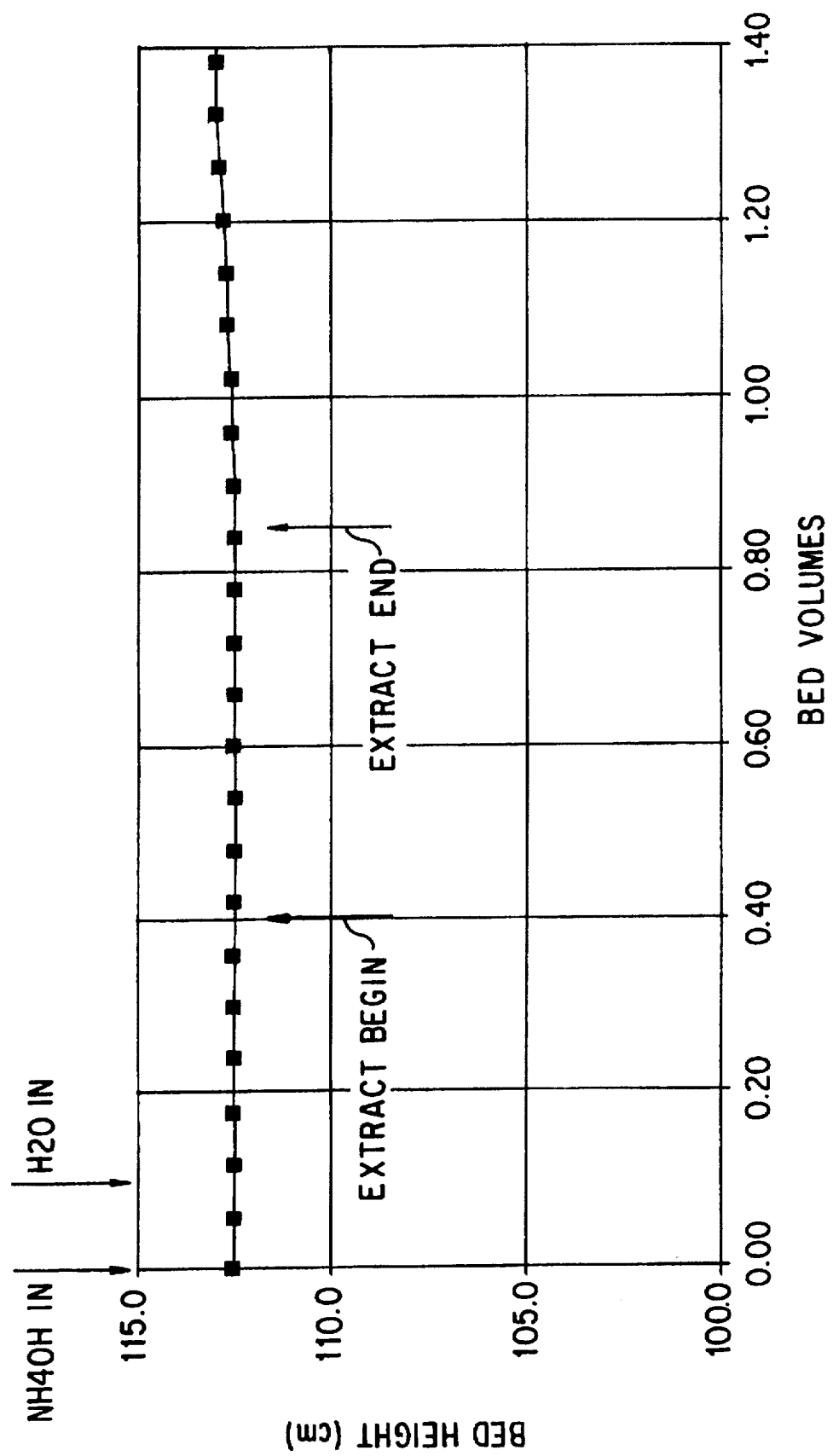
FIG. 14 is the bed height profile versus resin bed volumes plot during the desorption cycle at high linear velocity—2.5 cm\min—of the hydroxylamnine ion exchange process described in Example 3.

A column of 5 cm diameter was loaded with 2,081 cm³ of wet resin adsorbent. Testing conditions were similar to those described in Example 1 except the flow rate was increased to 50 cm³/min (2.55 cm/min linear velocity). Conductivity, pH and bed height profiles as a function of bed volume during the adsorption cycle are illustrated in FIGS. 9, 10, and 11 respectively. Similar plots of data obtained during the desorption cycle are shown in FIGS. 12, 13, and 14. As shown in these Figures, combinations of conductivity, pH and bed height monitoring are effective tools for the control of the process for the purification of hydroxylamine from aqueous solutions containing $HA^+$, $NH_4^+$, $H^+$ and anion counter ions with ion-exchange sorbents. The final HA product concentration was 1.04N. The reason for this higher product concentration is that a higher $NH_4OH$ concentration of 7.27N was used to elute $HA^+$. This gives a sharper desorption profile, however, it requires a more stringent control procedure in order to prevent contamination of HA product with the $HN_4^+$ eluent.

Example 4

Four columns of 5 cm diameter were loaded with wet resin adsorbents of 1,825 to 2,098 cm³. Testing conditions were similar to those described in Example 1 except the flow rates were chosen at from 19 to 22 cm³/min (0.97 to 1.12 cm/min linear velocity). A conductivity probe was connected at the exit end of the column. The purified HA was collected from the effluent stream using the conductivity probe as the process control device with collection beginning at a conductivity of about 0.1 mMhos/cm and ending when the effluent conductivity reaches 0.4 mMhos/cm. The HA product concentrations ranged from 0.60–0.80N, depending on the time of product collection and the concentration of $NH_4OH$ used as the desorbent. The results of each process control scheme, however, using a set collection time and eluant concentration are reproducible. The collected HA using the current process control method was neutralized with nitric acid to produce hydroxylamine nitrate (HAN) and concentrated to a HAN concentration of 25% (wt./wt.). These HAN samples were tested for their potential contamination with $NH_4^+$ by a micro Kjeldahl method. Examples of analytical results are summarized in Table 1. These results show that the process control method is effective in preventing the recontamination by the desorbent ($HN_4^+$). This control method will ensure a production of pure hydroxylamine.

TABLE 1

Purity of HA Samples

| Run Number | Wt. % of $NH_4NO_3$ |
|---|---|
| 1 | 0.086 |
| 2 | 0.124 |
| 3 | 0.191 |
| 4 | 0.258 |
| 5 | 0.116 |
| 6 | 0.249 |
| 7 | 0.228 |
| 8 | 0.151 |
| 9 | 0.123 |
| 10 | 0.123 |
| 11 | 0.120 |
| 12 | 0.532 |

Example 5

A 2.54 cm diameter by 94.5 cm long insulated column was initially charged with 475 cm³ of wet adsorbent, IR-132C(H) (16–40 mesh) manufactured by Rohm and Haas Company (in de-ionized water). The ion-exchanger had been ion-exchanged to the $NH_4^+$ form. An aqueous feed (183.1 mL, 0.39 bed volumes) containing 1.91N $HA^+$, 4.50 $NH_4^+$ and 2.16N $H^+$ with sulfate counter ions was heated to 45° C. and fed at a flow rate of 11.4 cm³/min (2.25 cm/min linear velocity) into the column. This was followed by deionized water (45° C.) at the same flow rate. The conductivity and pH of the effluent were continuously monitored. Cations in the effluent were also measured by collecting small samples of the solution at a fixed time interval. As the conductivity decreased to zero, deionized water of room temperature was, instead, used to cool the column. A total of 2165 ml of deionized water was used.

The desorption cycle began with a desorbent of 35.7 cm³ of 7.474N NH₄OH (22° C.) at a flow rate of 11.0 cm³/min. This was followed immediately by deionized water (45° C.) at the same flow rate. A total of 1.2 bed volumes of water was used for the rinsing of the ion-exchanger for getting ready for the subsequent cycle. Cations and anions in the effluent were measured by collecting samples at each 30 seconds interval.

Figure 15:
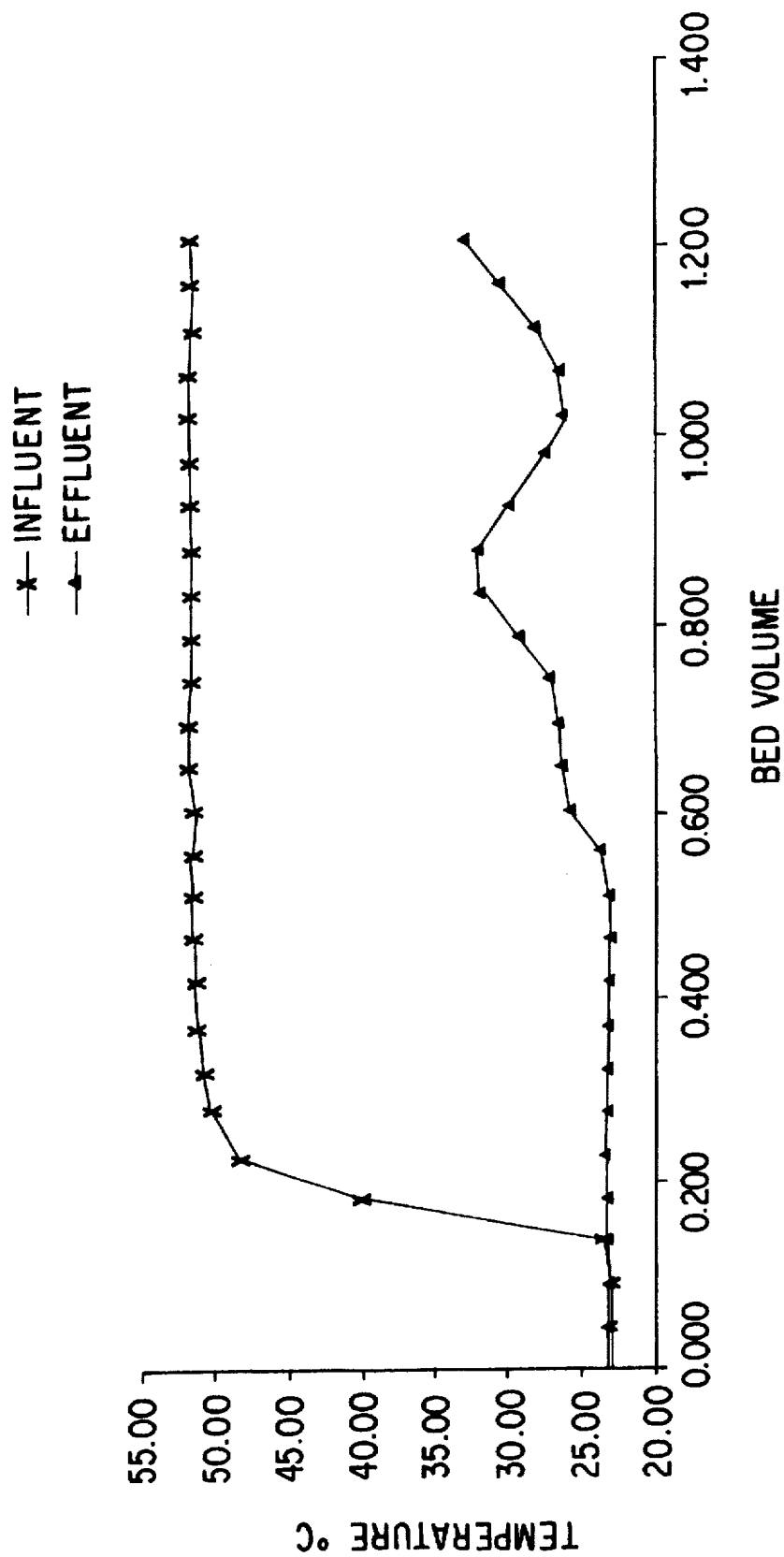
FIG. 15 is a plot of column influent and effluent temperature profiles during the desorption cycle of the hydroxylamine ion exchange process described in Example 5.
Figure 16:
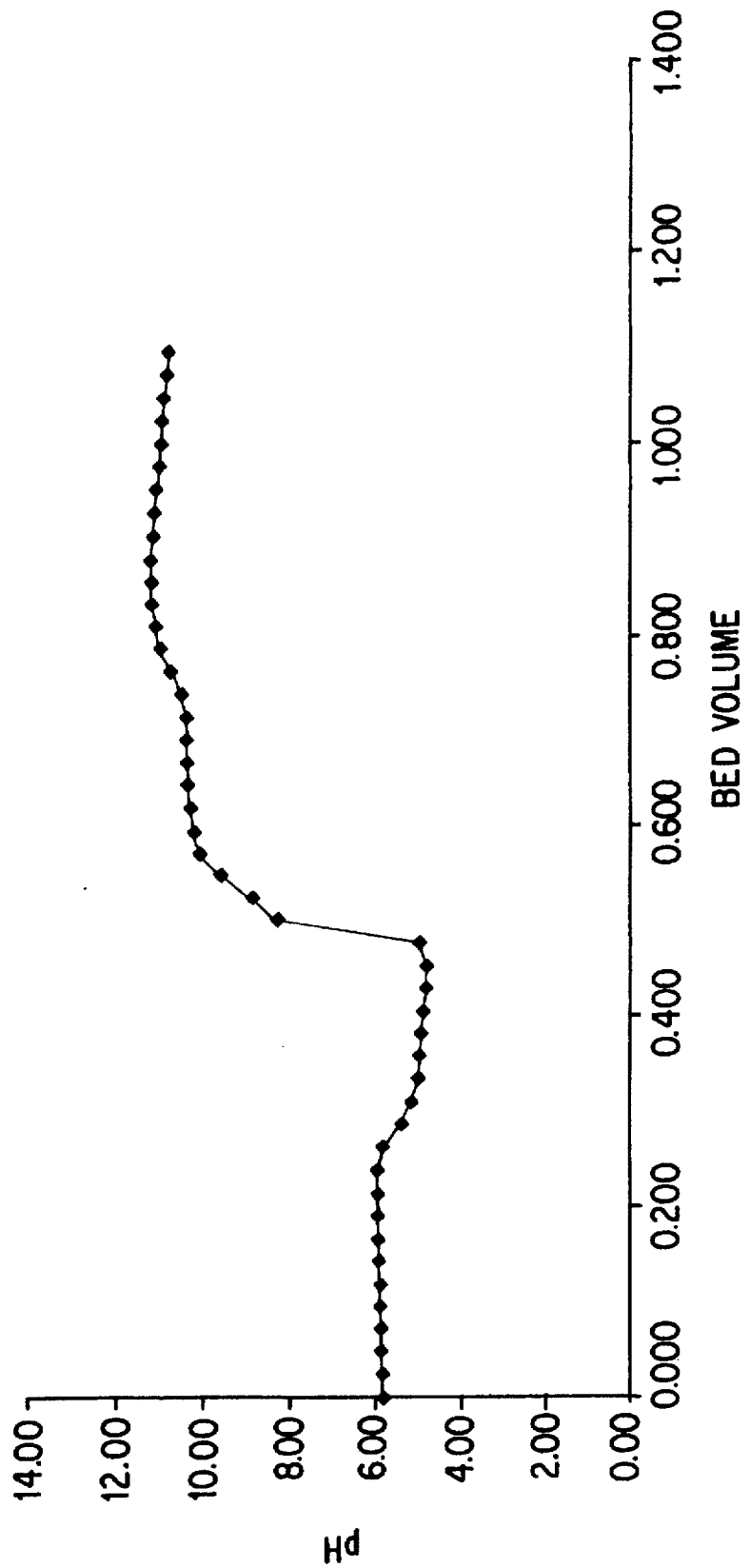
FIG. 16 is the pH profile during the desorption cycle of the hydroxylamine ion exchange process described in Example 5.
Figure 17:
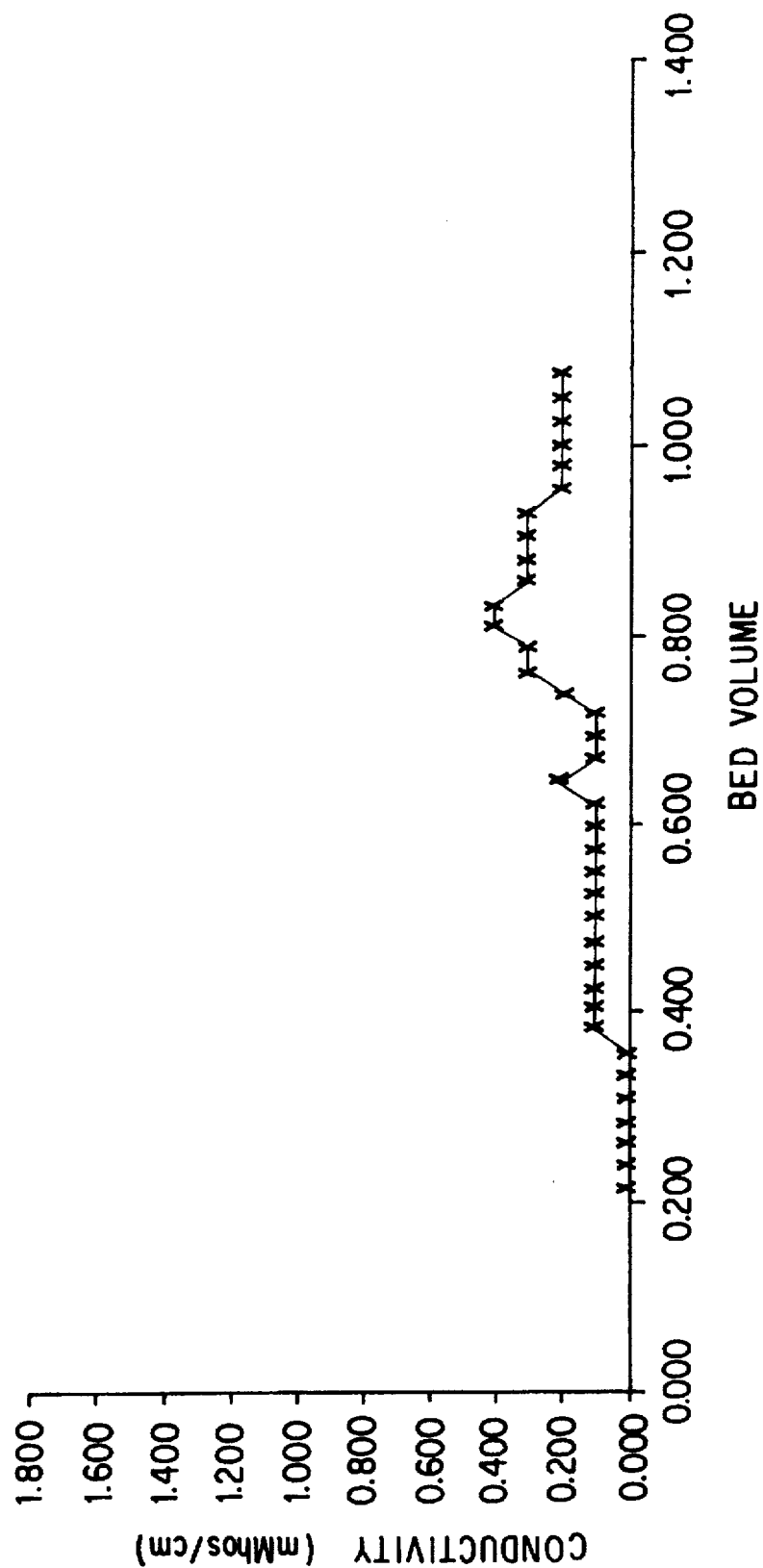
FIG. 17 is the conductivity profile during the desorption cycle of the hydroxylamine ion exchange process described in Example 5.

The influent and effluent temperature profiles are illustrated in FIG. 15. The effluent temperature during the desorption never exceeded more than 30° C. The pH and conductivity profiles are shown in FIGS. 16 and 17 respectively.

Figure 18:
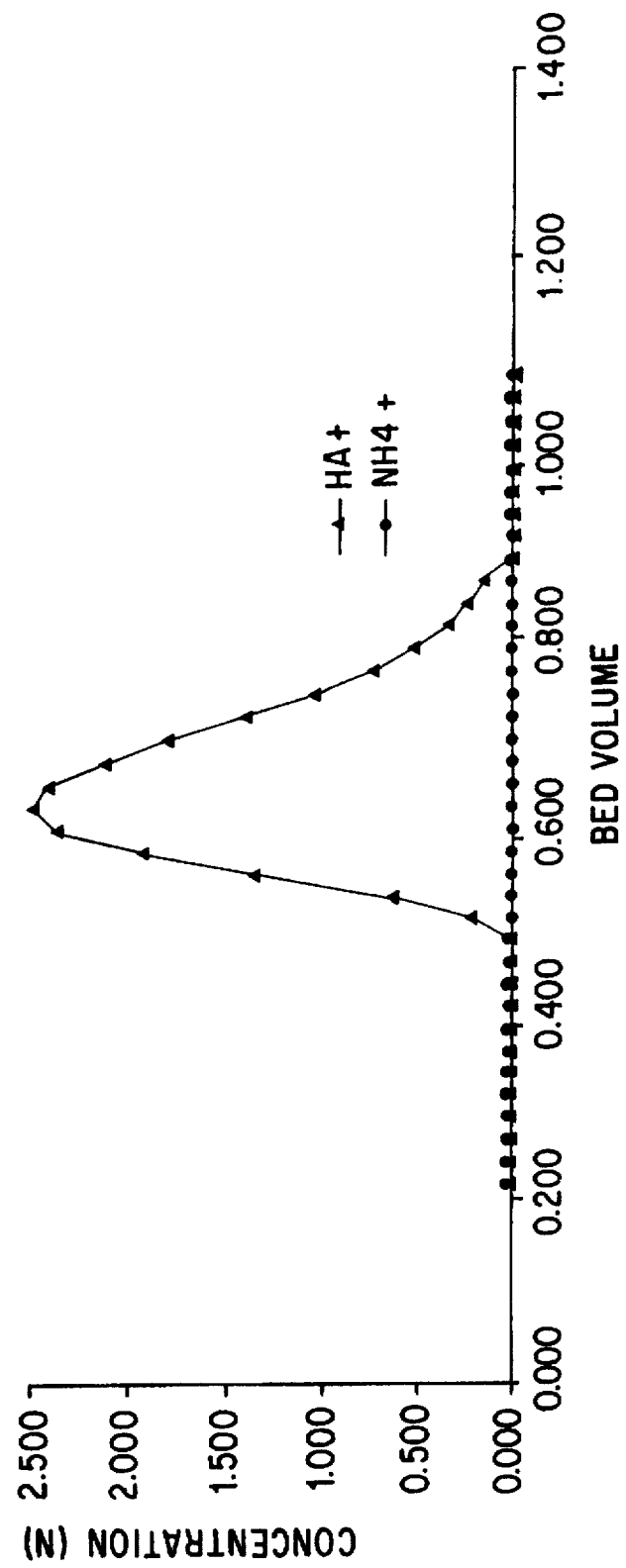
FIG. 18 is the product concentration profile of the hydroxylamine ion exchange process described in Example 5.
Figure 19:
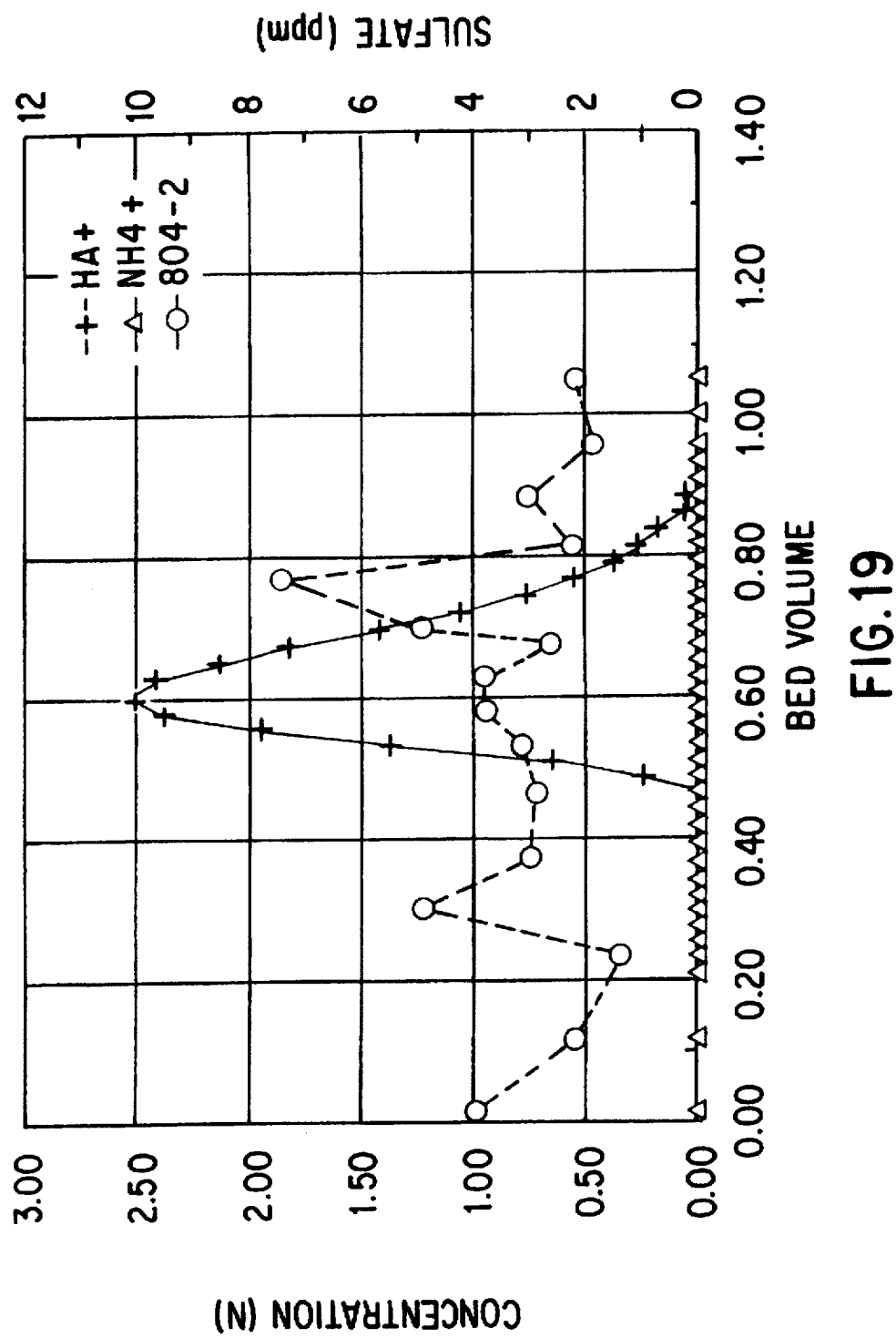
FIG. 19 is the desorption concentration profile of hydroxylamine, ammonia, and sulfate during the desorption cycle of the hydroxylamine ion exchange process described in Example 5.

The concentration profiles of hydroxylamine (HA) and ammonium ion ($NH_4^+$) shown in FIG. 18 illustrate an excellent purification of HA in the improved process. The sulfate contamination in the recovered product is illustrated in FIG. 19. An average sulfate concentration of 3.7 ppm was achieved with a hydroxylamine concentration of 1.2N in the purified product.

Example 6

The same column used in Example 5 was further tested with different process conditions. A feed containing 2.16N $H^+$, 1.92N $HA^+$, and 4.54N $NH_4^+$ was heated to 45° C. and pumped into the column at a flow rate of 23.6 mL/min (linear velocity of 4.42 cm/min). This was followed by a heated (45° C.) deionized water at the same flow rate. After 3 minutes, the water coil was removed from the constant temperature bath and a total of 989 ml of water (2.07 bed volumes) was introduced. At that time, the column temperature was lowered to 22° C.

38.3 mL of ammonium hydroxide desorbent (22° C.) were introduced at a flow rate of 22.4 mL/min (4.42 cm/min linear velocity). This was immediately followed by heated deionized water (45° C.) at the same flow rate.

A total of 1.4 bed volumes of water was used for the rinsing of the ion-exchanger material. During both the ion-exchange and desorption, conductivity and pH of the effluent solution were monitored. The concentrational profiles of HA and $NH_4^+$ were monitored by collecting samples at an interval of 15 seconds.

Figure 20:
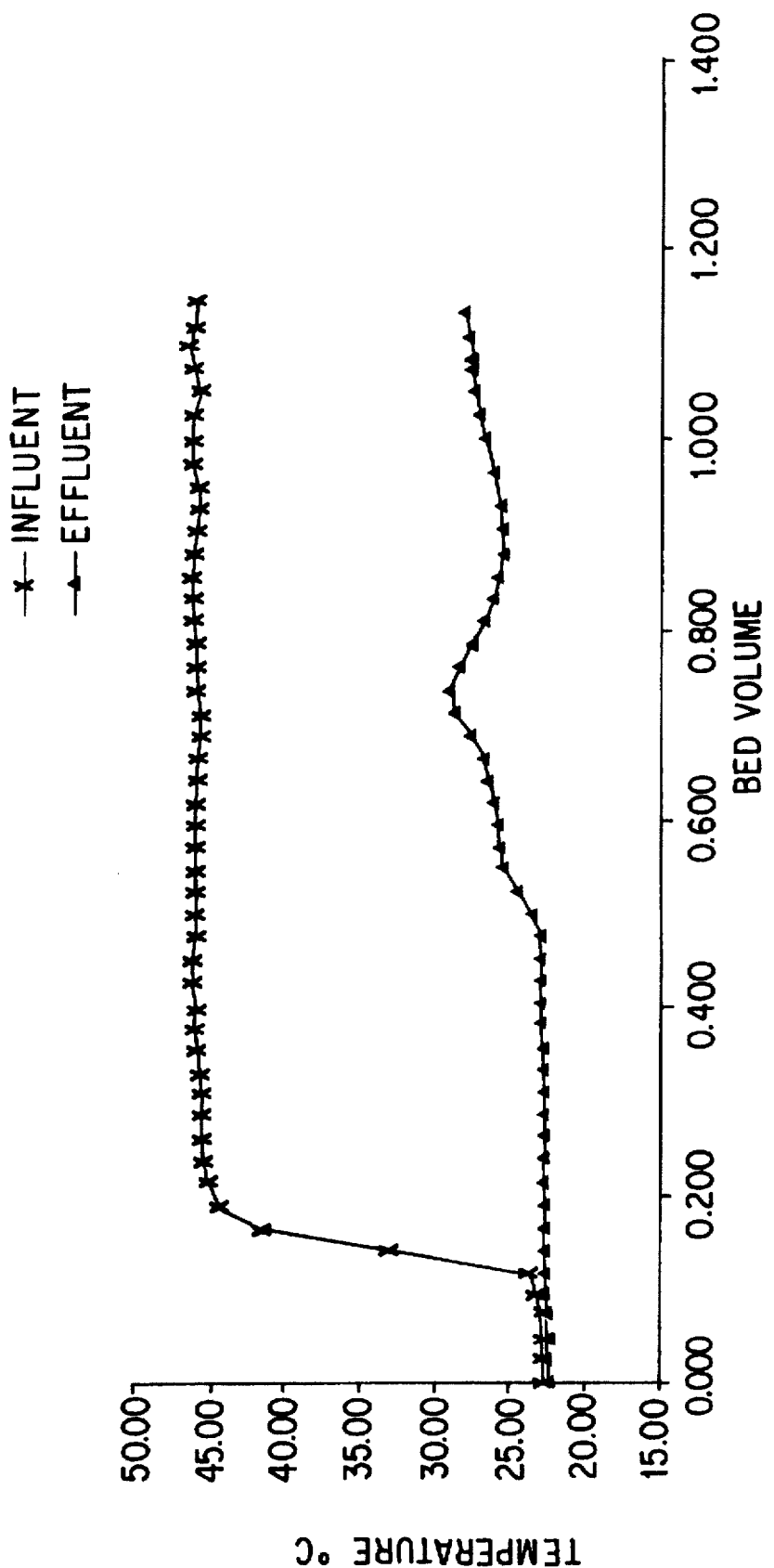
FIG. 20 is the temperature profile of an ion exchange column influent and effluent during the desorption step of the hydroxylamine ion exchange process described in Example 6.
Figure 21:
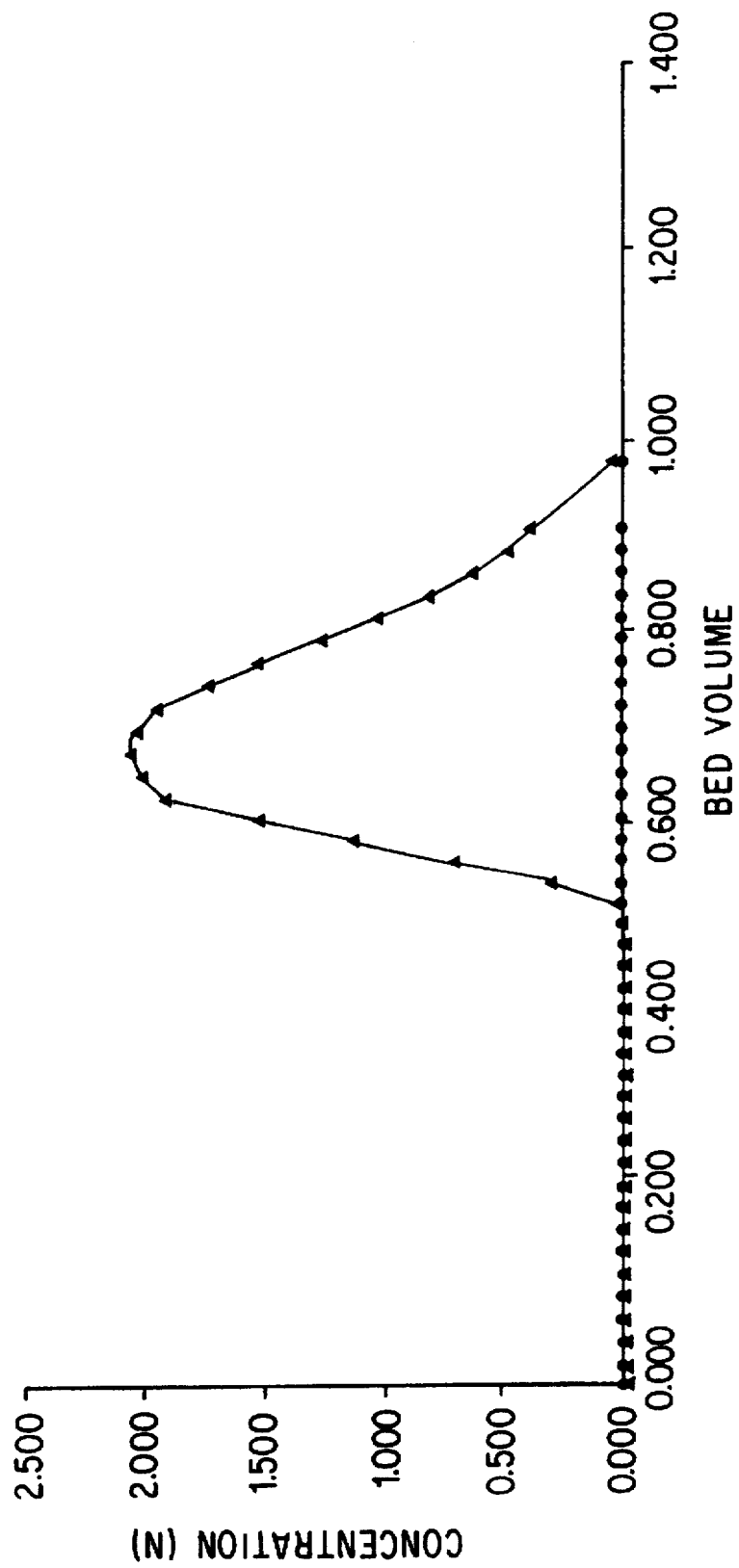
FIG. 21 is the hydroxylamine ($\Delta$) and ammonia ion (o) concentration profile during the desorption cycle of the hydroxylamine ion exchange process described in Example 6.

Due to the higher flow rates both for the feed and the desorbent, the column effluent temperatures (see FIG. 20) were higher than that observed in Example 5 (FIG. 15). However, the HA and $NH_4^+$ concentrational profiles are similar to those for Example 5 (see FIGS. 18 and 21). The sulfate concentration, on the other hand, was high at 31.6 ppm.

Example 7

A column of 2.54 cm diameter was loaded with 480 cm³ of wet resin adsorbent. Dowex HGR-W2(16–40 mesh) from Dow Chemical Company. The resin material was exchanged to $NH_4^+$ from $H^+$ form before it was loaded. A feed containing 2.16N $H^+$, 1.91N $HA^+$, and 4.52N $NH_4^+$ was heated to 50° C. and pumped into the column at a flow rate of 10.5 mL/min (linear velocity of 2.07 cm/min). This was followed by warm deionized water (50° C.) for 8 minutes and then deionized water at room temperature for a total of 1.52 bed volumes. At the end of the water wash, the temperature of the column was returned to room temperature.

Figure 22:
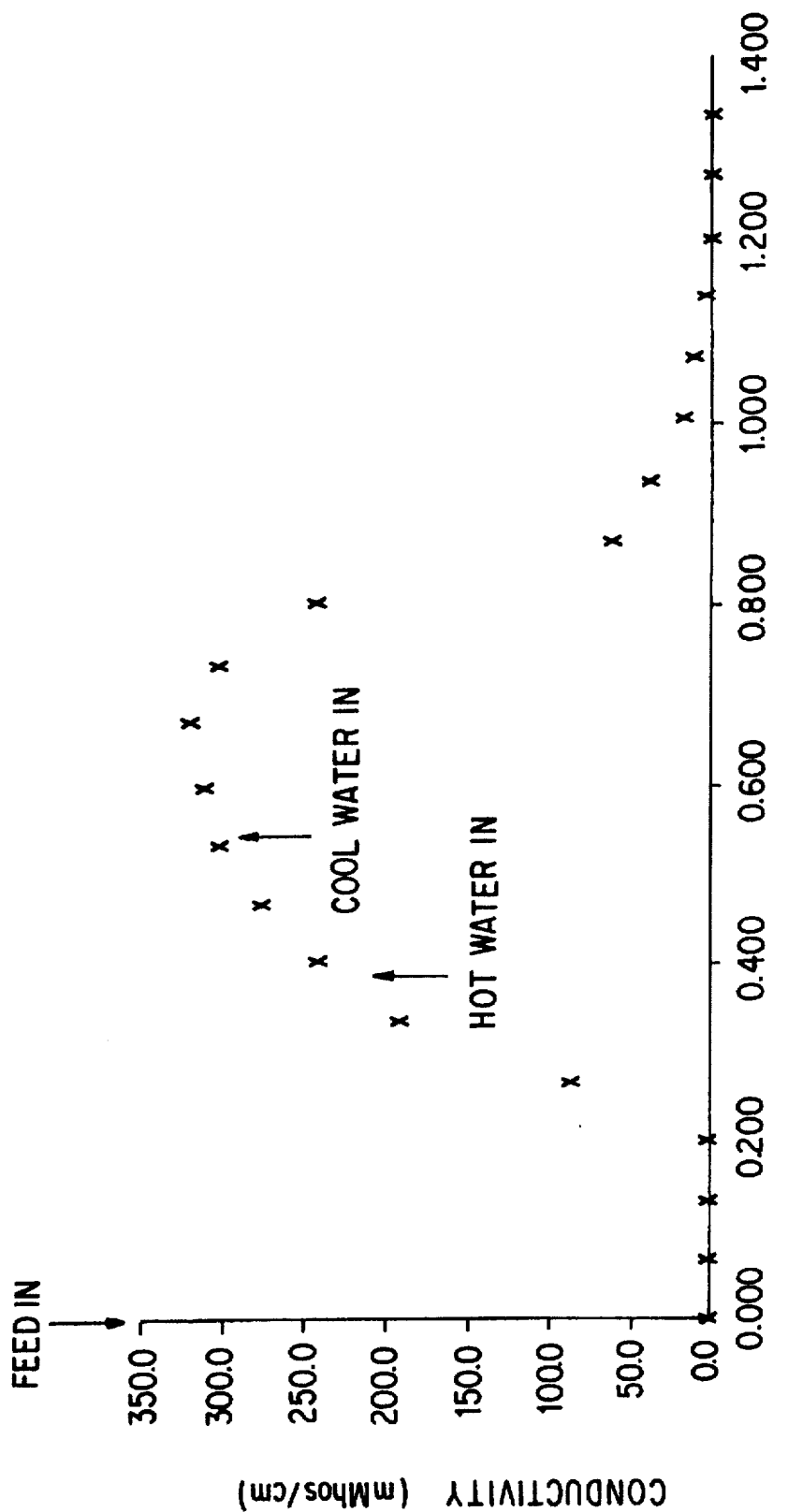
FIG. 22 is the conductivity profile of the ion exchange effluent stream from a hydroxylamine ion exchange process of Example 7 during the ion exchange absorption step.
Figure 23:
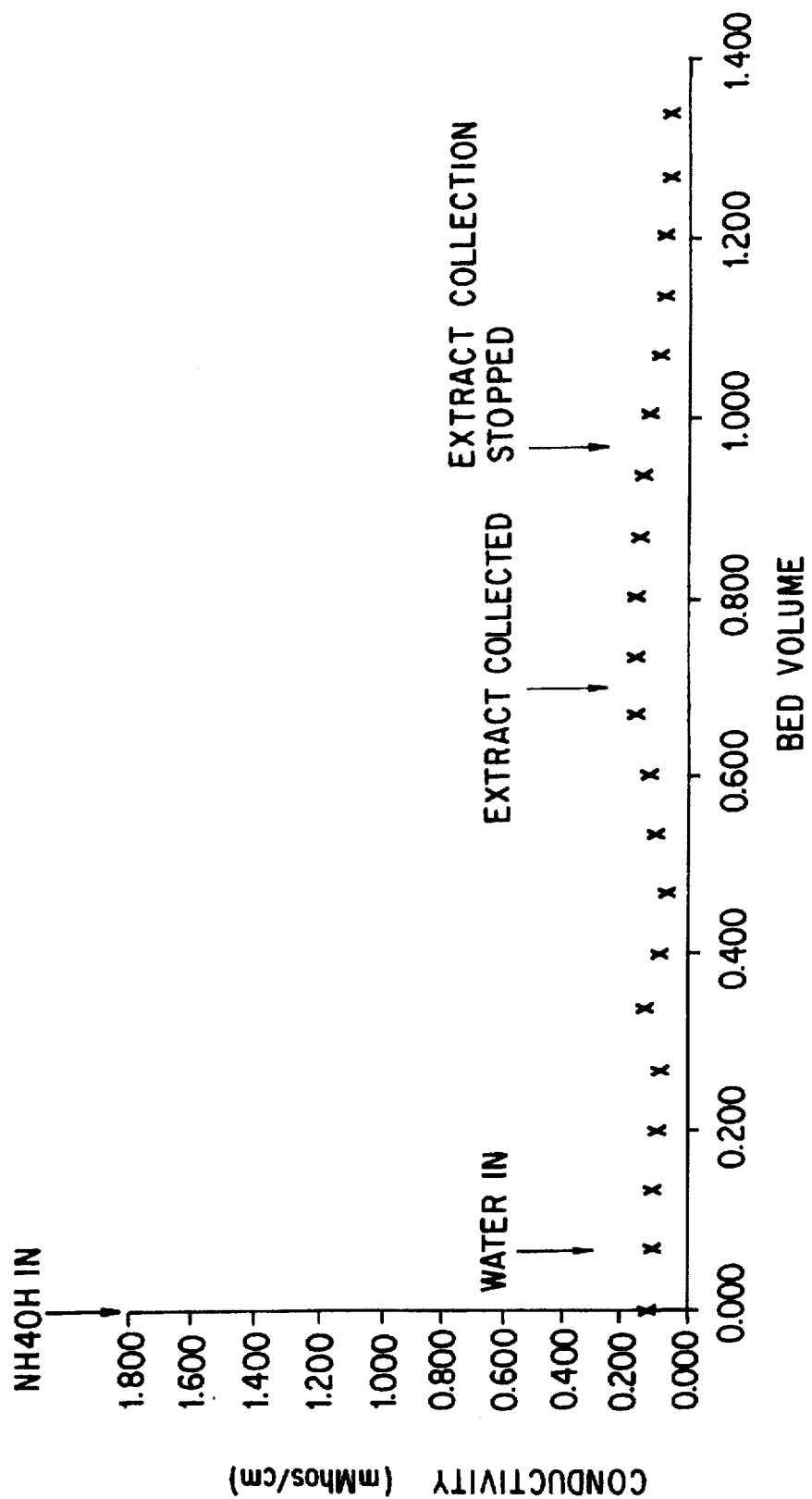
FIG. 23 is the column effluent conductivity profile during the desorption step of the hydroxylamine ion exchange process of Example 7.

34.7 mL of 7.89N NH₄OH were introduced into the column at a flow rate of 10.5 ml/mm (linear velocity of 2.07 cm/min). This was followed by heated deionized water at the same flow rate. A total of 1.4 bed volumes of water was used for the rinsing of the column. During the ion-exchange and the desorption, the temperature and the conductivity of the effluent solution were monitored, continuously. Conductivity profiles (FIGS. 22 and 23) were used to monitor the process as shown in these figures. 154.5 mL of pure HA at a concentration of 1.11N were recovered. The sulfate impurity was measured to very low at 3.2 ppm.

Example 8

The same column and similar procedures as in Example 7 were used in this Example except both the feed flow rate and the desorbent flow rates were increased to 21 ml/min (4.14 cm/min linear velocity). The total feed was 175 ml (337.7 milliequivalents) and the desorbent concentration was 7.567N with a total volume of 36.4 mL (284.6 milliequivalents). A total of 173 mL of pure HA was recovered with a concentration of 1.16N. However, the sulfate impurity increased to 23.7 ppm. This is consistent with the value of 31.6 ppm observed for Example 6 where the linear velocity was 4.42 cm/min.

Example 9

Following the experiment described in Example 8, the same column and similar experimental procedures were used except that the flow rate was the same as used in Example 7. 175 mL of feed were used (337.7 milliequivalents). The desorbent used was 7.743N NH₄OH with a total volume of 36.8 mL (284.6 milliequivalents). A total of 152 mL of pure HA was recovered at a concentration of 1.21N. The sulfate impurity was lowered to 3.3 ppm showing a consistent result as comparing to that of Example 7.

Example 10

A moving bed process was designed on a laboratory scale using 30 glass columns of 2.67 cm ID×1 m long associated with a laboratory model ISEP contactor manufactured by Advanced Separation Technologies Incorporated, Lakeland, Fla. The process simulates moving of resin exchanger by rotation of the 30 cells around twenty (20) injection ports. All glass columns were loaded with 540 cm³ IR-132C(H) resin (16–40 mesh) supplied by Rohm and Haas Company. The resin had been exchanged to $NH_4^+$ from $H^+$ form before loading. The contactor was rotated at a rate of 162 minutes per revolution which is equivalent to the moving of the resin exchanger at 100 cm³/min. A feed containing 2.17N $H^+$, 1.92N $HA^+$, and 4.55N $NH_4^+$ was injected into ports 8 and 9 at a flow rate of 43.2 cm³/min. The feed was heated at 45° C. However, due to heat loss in the transfer line, temperatures at the inlet and the outlet of port 8 were 30.6° and 29.4° C. respectively. Hydroxylamine ion was selectively adsorbed on the resin. Deionized water preheated at 45° C. for adsorption washing was introduced at port 1 at a flow rate of 99.9 cm³/min and subsequently through port 2. The wash effluent was collected and reheated at the wash advance tank and distributed over ports 3–7 with equal flow rates. Since effluents from ports 3–5 contained some valuable HA$^+$, they were collected, reheated and pumped through ports 10–11 to maximize the HA recovery.

After the resin had been loaded with HA$^+$ and feed entrained in the void space had been washed and removed, the resin moved to port 20 where NH$_4$OH at 7.02N (room temperature) was introduced at a flow rate of 9.9 cm$^3$/min. The strip rinse water (45° C.) was injected in port 12 at a flow rate of 102.2 cm$^3$/min and cycled in series in port 13. The port 13 effluent was also collected, reheated, and distributed to ports 14–19. The purified product is collected at ports 14–16. A total of 3 cycles were conducted. Between cycles 2 and 3, weight checks were taken for a period of 5 hours. Eighteen samples were also collected simultaneously at the exit of each port. Results of analysis on these samples are shown in Table 1. The samples recovered as pure HA products from ports 15 and 16 were also analyzed for trace metals as shown in Table 2.

TABLE 2

Results of Analysis on Samples Collected at the Exit of Each Port

| Port # | H$^+$ (N) | HA$^+$ (N) | NH$_4^+$ (N) | SO$_4^-$ (ppm) |
|---|---|---|---|---|
| 2 | 0 | 0 | 0 | — |
| 3 | 0 | 0 | 0 | 2370 |
| 4 | 0.34 | 0 | 0.48 | 36,000 |
| 5 | 1.95 | 1.56 | 4.31 | 386,000 |
| 6 | 1.92 | 1.37 | 4.62 | 424,000 |
| 7 | 1.58 | 0.87 | 4.17 | 327,000 |
| 8 | 0.90 | 0.16 | 2.89 | 190,000 |
| 9 | 0.72 | 0 | 2.57 | 167,000 |
| 10 | 0.29 | 0 | 2.39 | 134,000 |
| 11 | 0 | 0 | 0 | 26,200 |
| 12 | — | — | — | — |
| 13 | 0 | 0 | 0 | — |
| 14 | 0 | 0.57 | 0 | 11 |
| 15 | 0 | 1.55 | 0 | 12 |
| 16 | 0 | 1.46 | 0 | 14 |
| 17 | 0 | 0 | 0 | 25 |
| 18 | 0 | 0 | 0 | 23 |
| 19 | 0 | 0 | 0 | 26 |
| 20 | 0 | 0 | 0 | 25 |

TABLE 3

Results of Trace Metal Analysis for Samples from Ports 15 & 16

| Metal Ion | Port #15 (ppb) | | Port #16 (ppb) | |
|---|---|---|---|---|
| | Test #1 | Test #2 | Test #1 | Test #2 |
| Cr | <30 | <30 | <30 | <30 |
| Co | <20 | <20 | <20 | <20 |
| Cu | 67 | 70 | 56 | 41 |
| Fe | <100 | <100 | 110 | <100 |
| Mn | <20 | <20 | <20 | <20 |
| Ni | <20 | <20 | <20 | <20 |
| V | <20 | <20 | <20 | <20 |
| Zn | <20 | <20 | <20 | <20 |
| Hg | 4.6 | 6.0 | 2.6 | 2.9 |

The composite samples collected from ports 14–16 during the weight check were also analyzed. Results are summarized in Table 4.

TABLE 4

Products Recovery in 300 Minutes

| | Port 14 | Port 15 | Port 16 |
|---|---|---|---|
| Total volume (cm$^3$) | 4,230 | 4,080 | 4,200 |
| HA (N) | 0.50 | 1.57 | 1.55 |
| pH | 10.3 | 10.1 | 9.2 |
| SO$_4^-$ (ppm) | 10 | 12 | 17 |

Example 11

The moving bed contactor for this Example was configurated as described in Example 10. The cycle time was reduced from 162 to 148 minutes (resin rate=109.5 cm$^3$/min). A feed containing 2.24N H$^+$, 1.96N HA$^+$, and 4.66N NH$_4^+$ was injected into ports 8 and 9 at a flow rate of 46.8 cm$^3$/min. The inlet and the outlet temperatures at port 8 were increased to 40° and 37.8° C. respectively.

The concentration of the NH$_4$OH desorbent was increased to 7.66N and the desorption flow rate was at 10.8 cm$^3$/min. Deionized water flow rates for the adsorption wash and strip rinse were controlled at 106.7 and 115.0 cm$^3$/min respectively. Again, 3 cycles were conducted and port samples and composite products were collected as described in Example 10. Results of analysis are summarized in Tables 5 and 6.

TABLE 5

Results of Analysis on Samples Collected at the Exit of Each Port

| Port # | H$^+$ (N) | HA$^+$ (N) | NH$_4^+$ (N) | SO$_4^-$ (ppm) |
|---|---|---|---|---|
| 2 | 0 | 0 | 0 | 636 |
| 3 | 0 | 0 | 0 | 3,450 |
| 4 | 0 | 0 | 0 | 10,000 |
| 5 | 1.36 | 0.9 | 0.22 | 253,000 |
| 6 | 2.17 | 1.70 | 4.88 | 424,000 |
| 7 | 1.98 | 1.33 | 4.84 | 374,000 |
| 8 | 1.65 | 0.71 | 4.40 | 313,000 |
| 9 | 1.53 | 0.35 | 4.60 | 288,000 |
| 10 | 0.47 | 0 | 3.09 | 149,000 |
| 11 | 0 | 0 | 0 | 1,380 |
| 12 | — | — | — | — |
| 13 | 0 | 0 | 0 | 5.8 |
| 14 | 0 | 0.33 | 0 | 6.8 |
| 15 | 0 | 1.64 | 0 | 7.3 |
| 16 | 0 | 2.2 | 0 | 9.4 |
| 17 | 0 | 0 | 0 | 18 |
| 18 | 0 | 0 | 0 | 19 |
| 19 | 0 | 0 | 0 | 24 |
| 20 | 0 | 0 | 0 | 102 |

TABLE 6

Products Recovery in 300 Minutes

| | Port 14 | Port 15 | Port 16 |
|---|---|---|---|
| Total volume (cm$^3$) | 4,410 | 4,740 | 4,950 |
| HA (N) | 0.23 | 1.22 | 1.98 |
| pH | 10.0 | 10.3 | 9.5 |
| SO$_4^-$ (ppm) | 7 | 8 | 10 |

Example 12

The contractor was re-configurated as shown in FIG. 25. One additional adsorption wash port was added. In addition, more resin was added to each column with a total of 570 cm$^3$ per column. Some changes in operational parameters were:

1. Cycle time: 156 minutes
2. Feed: 2.17N $H^+$, 1.92N $HA^+$, and 4.59N $NH_4^+$
3. Desorbent: 7.60N $NH_4OH$
4. Feed flow rate: 47.5 $cm^3$/min
5. Desorbent flow rate: 11.5 $cm^3$/min
6. Adsorption water wash flow rate: 119.8 $cm^3$/min
7. Strip rinse flow rate: 114.8 $cm^3$/min
8. Composite sample collection: 360 min.

Results of the continuous process for the purification of HA are shown in Tables 7 and 8.

TABLE 7

Results of Analysis on Samples Collected at the Exit of Each Port

| Port # | $H^+$ (N) | $HA^+$ (N) | $NH_4^+$ (N) | pH | $SO_4^-$ (ppm) |
|---|---|---|---|---|---|
| 2 | 0 | 0 | 0 | 3.34 | 423 |
| 3 | 0 | 0 | 0 | 2.57 | 1,920 |
| 4 | 0 | 0 | 0 | 1.95 | 4,540 |
| 5 | 0.28 | 0.25 | 0.66 | 1.43 | 60,800 |
| 6 | 2.01 | 1.63 | 4.39 | 0.89 | 406,000 |
| 7 | 1.90 | 1.37 | 4.48 | 0.69 | 403,000 |
| 8 | 1.43 | 0.77 | 3.70 | 0.81 | 293,000 |
| 9 | 1.26 | 0.21 | 3.85 | 0.89 | 262,000 |
| 10 | 0.65 | 0 | 3.29 | 1.18 | 193,000 |
| 11 | 0 | 0 | 0 | 6.81 | 508 |
| 12 | 0 | 0 | 0 | 9.32 | 2.3 |
| 13 | 0 | 0.04 | 0 | 11.1 | 3.2 |
| 14 | 0 | 0.82 | 0 | 11.7 | 4.3 |
| 15 | 0 | 2.42 | 0.29 | 11.2 | 6.6 |
| 16 | 0 | 0 | 0 | 9.8 | 13.1 |
| 17 | 0 | 0 | 0 | 5.0 | 20.3 |
| 18 | 0 | 0 | 0 | 4.9 | 7.0 |
| 19 | 0 | 0 | 0 | 6.1 | 4.0 |
| 20 | — | — | — | — | — |

TABLE 8

Products Recovery in 360 Minutes

|  | Port 13 | Port 14 | Port 15 |
|---|---|---|---|
| Total volume ($cm^3$) | 5,040 | 6,048 | 6,048 |
| HA (N) | 0.07 | 0.68 | 1.97 |
| pH | 10.4 | 11.1 | 10.9 |
| $SO_4^-$ (ppm) | <3 | 5 | <3 |

Example 13

The same contactor configuration was used in this Example as was used in Example 12. Several processing changes were made, however.

1. Feed flow rate: 47.4 $cm^3$/min
2. Desorbent: 7.07N $NH_4OH$
3. Desorbent flow rate: 10.5 $cm^3$/min
4. Adsorption water wash flow rate: 118.0 $cm^3$/min
5. Strip rinse flow rate: 119.6 $cm^3$/min
6. Composite sample collection: 300 min.

Results are summarized in Tables 9 and 10.

TABLE 9

Results of Analysis on Samples Collected at the Exit of Each Port

| Port # | $H^+$ (N) | $HA^+$ (N) | $NH_4^+$ (N) | $SO_4^-$ (ppm) |
|---|---|---|---|---|
| 1 | 0 | 0 | 0 | 51 |
| 2 | 0 | 0 | 0 | 374 |
| 3 | 0 | 0 | 0 | 1,200 |
| 4 | 0 | 0 | 0 | 4,900 |
| 5 | 0.43 | 0.34 | 0.92 | 83,000 |
| 6 | 2.08 | 1.68 | 4.59 | 412,000 |
| 7 | 1.85 | 1.29 | 4.42 | 371,000 |
| 8 | 1.49 | 0.81 | 3.82 | 299,000 |
| 9 | 1.32 | 0.21 | 4.10 | 277,000 |
| 10 | 0.71 | 0 | 3.30 | 195,000 |
| 11 | 0 | 0 | 0 | 6,143 |
| 12 | 0 | 0 | 0 | 2.6 |
| 13 | 0 | 0.04 | 0 | 3.3 |
| 14 | 0 | 0.49 | 0 | 2.8 |
| 15 | 0 | 1.96 | 0 | 3.5 |
| 16 | 0 | 1.32 | 0 | 16.8 |
| 17 | 0 | 0 | 0 | 12.8 |
| 18 | 0 | 0 | 0 | 6.8 |
| 19 | 0 | 0 | 0 | 71.4 |
| 20 | 0 | 0 | 0 | 7.5 |

TABLE 10

Products Recovery in 300 Minutes

|  | Port 13 | Port 14 | Port 15 |
|---|---|---|---|
| Total volume ($cm^3$) | 5,910 | 6,000 | 5,820 |
| HA (N) | 0.05 | 0.57 | 1.91 |
| pH | 9.8 | 10.6 | 10.5 |
| $SO_4^-$ (ppm) | 3 | 3 | 4 |

These examples illustrate a continuous process for the purification of HA from an aqueous solution containing $H^+$, $HA^+$ and $NH_4^+$ with counter ions including sulfate, nitrate and chloride. The process achieves the purification and recovery of HA with the anion impurities at less than 5 ppm. The optimal process conditions consist of:

1. Employing a column of resin exchanger which is divided into at least four zones for selective ion-exchange, adsorption wash, desorption (stripping), and water rinse.
2. Contacting the feed solution with sulfonated cation exchange resins in the ion-exchange (adsorption) zone at temperatures between 25° and 35° C. at a linear velocity of 2.0–5.0 cm/min.
3. Washing the ion-exchange resins in the adsorption wash zone at a linear velocity of 4.0–20 cm/min with heated deionized water (35°–50° C.) of 1.0 to 1.2 times the bed volume of resin.
4. Desorbing HA with $NH_4OH$ at 7.0–8.0 N and at room temperature with a flow of 1.5–2.5 cm/min linear velocity and a total of 0.5–0.7 milliequivalents/mL of resin.
5. Rinsing the ion-exchange bed with heated water (35°–50° C.) at a linear velocity of 2.0–5.0 cm/min for a total of 1.0–1.2 times the bed volume of resin.
6. Collecting purified HA continuously at product port(s) and treating wash and rinse waste water at wash and rinse waste ports.

What we claim is:

1. A process for purifying hydroxylamine by the steps comprising;

(a) feeding an aqueous feed solution including hydroxylammonium ion and anion contaminants into an ion exchange column containing at least one cation exchange resin until a column effluent stream conductivity reaches from about 150 to about 250 mMhos/cm or a column effluent stream pH drops from about 5.0 to 7.5 to about 2.0 to 2.5;

(b) feeding wash water into the ion exchange column to give a water wash effluent stream;

(c) halting the wash water feed of step (b) when the wash water effluent stream conductivity drops below about 0.10 mMhos/cm or the effluent stream pH increases from about 2.0 to about 3.5 to 4.0;

(d) feeding an aqueous desorbent into the ion exchange column comprising water and desorbent that is capable of desorbing hydroxylammonium ion from the cation exchange resin;

(e) feeding a rinse water feed into the ion exchange column to give an ion exchange column desorbent effluent stream;

(f) collecting the desorbent effluent stream when the effluent conductivity rises above 0 mMhos/cm or when the effluent pH is about 4.0; and (g) halting the collection of the desorbent effluent when the effluent conductivity rises above about 0.40 mMhos/cm.

2. The process for purifying hydroxylamine of claim 1 wherein the desorbent effluent stream is collected when the effluent conductivity rises above 0 mMhos/cm.

3. The process for purifying hydroxylamine of claim 1 wherein the desorbent effluent stream collection is halted when the desorbent effluent stream conductivity reaches from about 0.40 to about 0.70 mMhos/cm.

4. The process for purifying hydroxylamine of claim 1 wherein the cation exchange resin is a sulfonated cation exchange resin.

5. The process for purifying hydroxylamine of claim 1 wherein the desorbent comprises one or more monovalent amine bases and hydroxide bases.

6. The process for purifying hydroxylamine of claim 5 wherein the desorbent is aqueous ammonium hydroxide.

7. The process for purifying hydroxylamine of claim 6 wherein the aqueous desorbent consists of an aqueous solution of ammonium hydroxide having a normality of at least 7.2.

8. The process for purifying hydroxylamine of claim 1 wherein the superficial velocity of the aqueous desorbent and the rinse water added to the ion exchange column in step (d) and step (e) is less that about 3.0 cm³/min.

9. The process for purifying hydroxylamine of claim 1 wherein the aqueous feed solution temperature is from about 25° to about 35° C.

10. The process for purifying hydroxylamine of claim 1 wherein the rinse water feed has a temperature of from about 35° to about 50° C.

11. The process for purifying hydroxylamine of claim 1 wherein aqueous feed solution step (a) is halted and water wash feed step (b) is begun when the conductivity of the column effluent exceeds about 250 mMhos/cm.

12. The process for purifying hydroxylamine of claim 1 wherein the water wash step (b) is halted when the wash water effluent stream conductivity approaches about 0 mMhos/cm.

13. The process for purifying hydroxylamine of claim 1 therein the aqueous feed containing hydrogen ion is fed into the ion exchange column in step (a) until the pH of the column effluent is 2.0.

14. The process for purifying hydroxylamine of claim 1 wherein water wash step (b) is halted when the increasing water wash effluent pH reaches at least 3.5.

15. A process for purifying hydroxylamine by the steps comprising:

(a) feeding an aqueous feed solution including hydroxylamine, hydrogen ions, ammonium ions, and anion contaminants into an ion exchange column containing at least one sulfated cation exchange resin;

(b) halting the feeding of the aqueous feed solution and starting feeding of water into the ion exchange column when the ion exchange column effluent conductivity exceeds about 200 mMhos/cm to give a first ion exchange column water wash effluent stream;

(c) halting the water feed of step (b) when the ion exchange column effluent conductivity reaches about 0 mMhos/cm;

(d) feeding an aqueous ammonium hydroxide solution having a normality of at least 7.2 into the ion exchange column;

(e) halting the feeding of aqueous ammonium hydroxide into the ion exchange column when a sufficient amount has been added to completely desorb the hydroxylamine;

(f) feeding a rinse water feed into the ion exchange column;

(g) collecting a desorbent stream emanating from the ion exchange column when the effluent conductivity rises above about 0 mMhos/cm wherein the desorbent stream is an aqueous stream of essentially pure hydroxylamine and essentially no anion contaminants;

(h) halting the collection of the desorbent stream when the effluent conductivity rises above about 0.40 mMhos/cm; and (i) halting the rinse water feed to the ion exchange column.

16. The process for purifying hydroxylamine of claim 15 wherein steps (a) through (i) are repeated in a cyclic process after the rinise water feed is halted in step (i).

17. The process for purifying hydroxylamine of claim 15 wherein the process is accomplished in a continuous simulated moving bed ion exchange apparatus.

18. A process for concentrating and purifying hydroxylamine using a continuous simulated ion exchange apparatus including at least four ion exchange zones, each ion exchange column loaded with a sulfated cation exchange resin comprising the steps;

(a) feeding an aqueous feed solution including a first concentration of hydroxylamine, hydrogen ions, ammonium ions, and anion contaminants into a first ion exchange zone to give a sulfated cation ion exchange resin loaded with hydroxylamine;

(b) feeding wash water into a second ion exchange zone including a sulfated cation ion exchange resin loaded with hydroxylamine to give a first ion exchange column water wash effluent stream;

(c) feeding an aqueous ammonium hydroxide solution having a normality of at least 7.2 into the third ion exchange zone and collecting a third ion exchange zone effluent;

(d) feeding a rinse water feed into the fourth ion exchange zone to give a fourth ion exchange zone desorbent stream; and (g) collecting the fourth ion exchange zone when the effluent conductivity rises above about 0 mMhos/cm and stopping the collecting of the fourth ion exchange zone effluent stream when the effluent conductivity rises above about 0.15 mMohs/cm to give an aqueous hydroxylamine product having a second hydroxylamine concentration that is greater than the first hydroxylamine concentration in the aqueous feed solution and including essentially no anion contaminants.

* * * * *

UNITED STATES PATENT AND TRADEMARK OFFICE
CERTIFICATE OF CORRECTION

PATENT NO.  : 5,762,897

DATED       : June 9, 1998

INVENTOR(S) : Chang et al.

It is certified that error appears in the above-identified patent and that said Letters Patent is hereby corrected as shown below:

Column 3, line 18, delete "aminonium" and substitute therefor -- ammonium --.

Column 5, line 23, delete "hydroxylamonium" and substitute therefor -- hydroxylammonium --.

Column 6, line 49, delete "Solution" and substitute therefor -- solution --.

Column 7, line 19, delete "oil" and substitute therefor -- ion --.

Column 7, line 21, delete "hydroxylamine" and substitute -- hydroxylammonium -- therefor.

Column 10, line 50, delete "tip" and substitute therefor -- up --.

Column 16, line 8, "ml/mm" should read -- ml/min --.

Column 16, line 53, delete "Rohin" and substitute -- Rohm -- therefor.

UNITED STATES PATENT AND TRADEMARK OFFICE
CERTIFICATE OF CORRECTION

PATENT NO. : 5,762,897

DATED : June 9, 1998

INVENTOR(S) : Chang et al.

It is certified that error appears in the above-identified patent and that said Letters Patent is hereby corrected as shown below:

Claim 16, line 3, delete "rinise" and substitute therefor -- rinse --.

Signed and Sealed this

Twenty-seventh Day of March, 2001

*Attest:*

NICHOLAS P. GODICI

*Attesting Officer*  *Acting Director of the United States Patent and Trademark Office*